US008437997B2

(12) United States Patent
Meurer et al.

(10) Patent No.: US 8,437,997 B2
(45) Date of Patent: May 7, 2013

(54) DYNAMIC CONNECTIVITY ANALYSIS

(75) Inventors: Mary Ellen Meurer, Pearland, TX (US);
Peter J. Vrolijk, Houston, TX (US);
Michael L. Sweet, Houston, TX (US);
John W. Snedden, The Woodlands, TX (US); Lawrence T. Sumpter, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 349 days.

(21) Appl. No.: 12/738,427

(22) PCT Filed: Nov. 21, 2008

(86) PCT No.: PCT/US2008/084327
§ 371 (c)(1),
(2), (4) Date: Apr. 16, 2010

(87) PCT Pub. No.: WO2009/094064
PCT Pub. Date: Jul. 30, 2009

(65) Prior Publication Data
US 2010/0235154 A1 Sep. 16, 2010

Related U.S. Application Data

(60) Provisional application No. 61/011,916, filed on Jan. 22, 2008.

(51) Int. Cl.
*G06G 7/48* (2006.01)
*G06G 7/50* (2006.01)

(52) U.S. Cl.
USPC .................................................. 703/10; 703/9

(58) Field of Classification Search .............. 703/9–10
See application file for complete search history.

(56) References Cited

U.S. PATENT DOCUMENTS

| 5,040,414 A | 8/1991 | Graebner |
| 5,159,833 A | 11/1992 | Graebner |

(Continued)

FOREIGN PATENT DOCUMENTS

| GB | 2145508 | 3/1985 |
| WO | WO 2007/007210 | 1/2007 |

(Continued)

OTHER PUBLICATIONS

Molenaar, M.M., Hatchell, P.J., van den Beukel, A.C., Shell International Exploration and Production B.V.; Jenvey, N.J., Stammeijer, J.G.F., van der Velde, J.J., de Haas, W.O., Shell U.K. Limited; Applying Geo-Mechanics and 4D: "4D In-Situ Stress" As a Complementary Tool for Optimizing Field Management; (NARMS), Jun. 5-9, 2004.*

(Continued)

*Primary Examiner* — Mary C Jacob
*Assistant Examiner* — Aniss Chad
(74) *Attorney, Agent, or Firm* — ExxonMobil Upstream Research Company Law Dept.

(57) ABSTRACT

Methods, computer-readable mediums, and systems analyze hydrocarbon production data from a subsurface region to determine geologic time scale reservoir connectivity and production time scale reservoir connectivity for the subsurface region. Compartments, fluid properties, and fluid distribution are interpreted to determine geologic time scale reservoir connectivity and production time scale reservoir connectivity for the subsurface region. A reservoir connectivity model based on the geologic time scale and production time scale reservoir connectivity for the subsurface region is constructed, wherein the reservoir connectivity model includes a plurality of production scenarios each including reservoir compartments, connections, and connection properties for each scenario. Each of the production scenarios is tested and refined based on production data for the subsurface region.

32 Claims, 20 Drawing Sheets

U.S. PATENT DOCUMENTS

| | | | |
|---|---|---|---|
| 5,586,082 | A | 12/1996 | Anderson et al. |
| 5,757,663 | A | 5/1998 | Lo et al. |
| 5,798,982 | A | 8/1998 | He et al. |
| 5,835,882 | A | 11/1998 | Vienot et al. |
| 6,246,963 | B1 | 6/2001 | Cross et al. |
| 6,393,906 | B1 | 5/2002 | Vityk et al. |
| 6,514,915 | B1 | 2/2003 | Beyer et al. |
| 6,661,000 | B2 | 12/2003 | Smith et al. |
| 6,754,588 | B2 | 6/2004 | Cross et al. |
| 6,810,332 | B2 | 10/2004 | Harrison |
| 6,826,483 | B1 | 11/2004 | Anderson et al. |
| 6,950,751 | B2 | 9/2005 | Knobloch |
| 6,980,940 | B1 * | 12/2005 | Gurpinar et al. ............ 703/10 |
| 6,985,841 | B2 | 1/2006 | Barroux |
| 7,124,030 | B2 | 10/2006 | Ellis |
| 7,174,254 | B2 | 2/2007 | Ellis |
| 7,210,342 | B1 | 5/2007 | Sterner et al. |
| 7,249,009 | B2 | 7/2007 | Ferworn et al. |
| 7,297,661 | B2 | 11/2007 | Beyer et al. |
| 7,337,660 | B2 | 3/2008 | Ibrahim et al. |
| 7,344,889 | B2 | 3/2008 | Kelemen et al. |
| 7,387,021 | B2 | 6/2008 | DiFoggio |
| 7,395,691 | B2 | 7/2008 | Sterner et al. |
| 7,520,158 | B2 | 4/2009 | DiFoggio |
| 7,526,418 | B2 | 4/2009 | Pita et al. |
| 7,529,626 | B1 | 5/2009 | Ellis |
| 8,078,405 | B2 | 12/2011 | Delorme et al. |
| 2002/0013687 | A1 | 1/2002 | Ortoleva |
| 2002/0049575 | A1 | 4/2002 | Jalali et al. |
| 2002/0067373 | A1 | 6/2002 | Roe et al. |
| 2002/0099504 | A1 | 7/2002 | Cross et al. |
| 2002/0120429 | A1 | 8/2002 | Ortoleva |
| 2004/0148147 | A1 | 7/2004 | Martin |
| 2004/0210547 | A1 | 10/2004 | Wentland et al. |
| 2004/0220790 | A1 | 11/2004 | Cullick et al. |
| 2004/0254734 | A1 | 12/2004 | Zabalza-Mezghani et al. |
| 2005/0096893 | A1 | 5/2005 | Feraille et al. |
| 2005/0149307 | A1 | 7/2005 | Gurpinar et al. |
| 2005/0199391 | A1 | 9/2005 | Cudmore et al. |
| 2005/0209866 | A1 | 9/2005 | Veeningen et al. |
| 2005/0209912 | A1 | 9/2005 | Veeningen et al. |
| 2005/0234690 | A1 | 10/2005 | Mainguy et al. |
| 2005/0256647 | A1 | 11/2005 | Ellis |
| 2006/0014647 | A1 | 1/2006 | Beyer et al. |
| 2006/0041409 | A1 | 2/2006 | Strebelle et al. |
| 2006/0047489 | A1 | 3/2006 | Scheidt et al. |
| 2006/0052938 | A1 | 3/2006 | Thorne et al. |
| 2006/0092766 | A1 | 5/2006 | Shelley et al. |
| 2006/0235667 | A1 | 10/2006 | Fung et al. |
| 2006/0235668 | A1 | 10/2006 | Swanson et al. |
| 2006/0241867 | A1 | 10/2006 | Kuchuk et al. |
| 2006/0265204 | A1 | 11/2006 | Wallis et al. |
| 2006/0277012 | A1 | 12/2006 | Ricard et al. |
| 2006/0277013 | A1 | 12/2006 | Bennis et al. |
| 2006/0282243 | A1 | 12/2006 | Childs et al. |
| 2006/0287201 | A1 | 12/2006 | Georgi et al. |
| 2006/0293872 | A1 | 12/2006 | Zamora et al. |
| 2007/0005253 | A1 | 1/2007 | Fornel et al. |
| 2007/0011646 | A1 | 1/2007 | Chrisochoides et al. |
| 2007/0013690 | A1 | 1/2007 | Grimaud et al. |
| 2007/0016389 | A1 | 1/2007 | Ozgen |
| 2007/0143024 | A1 | 6/2007 | Michel et al. |
| 2007/0156377 | A1 | 7/2007 | Gurpinar et al. |
| 2007/0219724 | A1 | 9/2007 | Li et al. |
| 2007/0219725 | A1 | 9/2007 | Sun et al. |
| 2007/0242564 | A1 | 10/2007 | Devi |
| 2007/0265778 | A1 | 11/2007 | Suter et al. |
| 2008/0040086 | A1 | 2/2008 | Betancourt et al. |
| 2008/0059140 | A1 | 3/2008 | Salmon et al. |
| 2008/0097735 | A1 | 4/2008 | Ibrahim et al. |
| 2008/0099241 | A1 | 5/2008 | Ibrahim et al. |
| 2008/0147326 | A1 | 6/2008 | Ellis |
| 2008/0173804 | A1 | 7/2008 | Indo et al. |
| 2009/0071239 | A1 | 3/2009 | Rojas et al. |
| 2011/0040536 | A1 | 2/2011 | Levitan |
| 2011/0191080 | A1 | 8/2011 | Klie |
| 2011/0251796 | A1 | 10/2011 | Waid et al. |

FOREIGN PATENT DOCUMENTS

| | | |
|---|---|---|
| WO | WO 2007/063442 | 6/2007 |
| WO | WO 2008/100614 | 8/2008 |
| WO | WO 2010/008647 | 1/2010 |

OTHER PUBLICATIONS

Ainsworth, R.B., Sequence Stratigraphic-Based Analysis of Depositional Architecture—A Case Study From a Marginal Marine Depositional Setting, 2005, Petroleum Geoscience, vol. 11, pp. 257-276.

Allen, J.R.L., Studies in Fluviatile Sedimentation; An Exploratory Quantitative Model for the Architecture of Avulsion-Controlled Alluvial Sites, 1978, Sedimentary Geology, vol. 21; 2, pp. 129-147.

Barton, M., et al., Understanding Hydrocarbon Recovery in Deepwater Reservoirs; Modeling Outcrop Data in the Third Dimension, 2004, AAPG, vol. 13, pp. 11.

Elshahawi, H., Samir, M., and Fathy, K., Correcting for Wettability and Capillary Pressure Effects on Formation Tester, Oct. 1-4, 2000, SPE 63075.

Firoozabadi, A., and Ramey, H.J., Surface Tension of Water-Hydrocarbon Systems At Reservoir Conditions, 1998, Journal of Canadian Petroleum Technology, Reservoir Engineering, vol. 41.

Gainski, M. et al., The Schiehallion Field: Detection of Reservoir Compartmentalisation and Identification of New Infill Targets Using 4D Seismic Surveys and Dynamic Production Data, Reservoir Compartmentalization [Online], Mar. 5-6, 2008, pp. 32. Retrieved from the Internet: URL:http//www.geolsoc.org.uk/webdav/site/GSL/shared/pdfs/events/abstracts/Reservoir AbstractBook.pdf, pp. 32.

James, W.R., Fairchild, W.R., Nakayama, G.P., Hippler, S.J. and Vrolijk, P.J., Fault-Seal Analysis Using a Stochastic Multi-Fault Approach, Jul. 2004, pp. 885.

Justwan, H., et al., Characterization of Static and Dynamic Reservoir Connectivity for the Ringhorne Field, Through Integration of Geochemical and Engineering Data: Reservoir Compartmentalization, 2008.

Justwan, H.K., et al., Unraveling Dynamic Fluid Connectivity Through Time-Lapse Geochemistry—From Example From the Ringhorne Field, Norway, AAPG Int'l Conf and Exhibition, Cape Town, South Africa 2008.

King, P.R., The Connectivity and Conductivity of Overlapping Sand Bodies, In, Buller, A.T, et al, Eds, North Sea Oil and Gas Reservoirs; II, Proceedings of the North Sea Oil and Gas Reservoirs Conference [Book, Conference Document], 1990, pp. 353-362.

Lame, D.K., and Hovadik, J., Connectivity of Channelized Reservoirs: A Modeling Approach, Petroleum Geoscience, 2006, vol. 12, pp. 291-308.

Lescoffit, G., and Townsend, C., Quantifying the Impact of Fault Modeling Parameters on Production Forecasting for Clastic Reservoirs, 2005, AAPG Hedberg Series, No. 2, pp. 137-149.

McCain, W.D., Jr., Reservoir-Fluid Property Correlations—State of the Art, SPERE, May 1991, pp. 266.

Manzocchi, T., et al., Sensitivity of the Impact of Geological Uncertainty on Production From Faulted and Unfaulted Shallow-Marine Oil Reservoirs: Objectives and Methods, Petroleum Geoscience, Feb. 2008, vol. 14, pp. 3-15.

Richards, B., et al., Reservoir Connectivity Analysis of a Complex Combination Trap Terra Nova Field, Jeanne d' Arc Basin, Newfoundland, Canada, Reservoir Compartmentalization, London Geological Society, Mar. 5-6, 2008, pp. 59.

Sales, J.K., Seal Strength Vs. Trap Closure; A Fundamental Control on the Distribution of Oil and Gas, in: Seals, Traps, and the Petroleum System, 1997, AAPG, vol. 67, pp. 57-83.

Schlumberger, Managing Uncertainty in Oilfield Reserves, Middle East Well Evaluation Review, 2004, vol. 12.

Snedden, J.W., Vrolijk, P.J., Sumpter, L.T., Sweet, M.L., Barnes, K., White, E., and Farrell, M.E., 2007, Reservoir Connectivity: Definitions, Examples and Strategies, IPTC 11375.

Sumpter, L., et al., Early Recognition of Potential Reservoir Compartmentalization, Reservoir Compartmentalization, London Geological Society, Mar. 5-6, 2008, pp. 84.

Sweet, M.L., and Sumpter, L.T., Genesis Field, Gulf of Mexico: Recognizing Reservoir Compartments on Geologic and Production Timescales in Deep-Water Reservoirs, AAPG, 2007, vol. 91, pp. 1701-1729.

Vrolijk, P.J., James, W., Myers, R.D., Maynard, J.R., Sumpter, L.T., and Sweet, M.L., Reservoir Connectivity Analysis—Defining Reservoir Connections and Plumbing, 2005, SPE 93577-MS.

* cited by examiner

DYNAMIC CONNECTIVITY ANALYSIS

CROSS-REFERENCE TO RELATED APPLICATION

This application is the National Stage of International Application No. PCT/US08/084,327, which claims the benefit of U.S. Provisional Application No. 61/011,916, filed Jan. 1, 2008 entitled DYNAMIC CONNECTIVITY ANALYSIS, the entirety of which is incorporated by reference herein.

TECHNICAL FIELD

This description relates generally to the field of reservoir characterization and geologic modeling. Specifically, this description relates to systems and methods for measuring and characterizing reservoir connectivity.

BACKGROUND

Information on a reservoir's connectivity is advantageous in managing an exploration and production asset from exploration to abandonment. Connectivity assessments can affect decisions made in all phases of an asset's life cycle, from optimally locating initial well locations, to improving reservoir management decisions later in the field's life. Estimation of connectivity at different scales and the ability to compare these connectivity assessments can provide insights to understanding risks associated with early gas and water issues in proposed wells, identifying better well operation procedures, ranking multiple realizations of geologic models, improving secondary field management decisions, and determining drainage areas and volumes.

SUMMARY

In one general aspect, a method for analyzing the connected quality of a subsurface region includes analyzing geologic time scale reservoir connectivity for the subsurface region. A baseline reservoir connectivity model is developed based on the geologic time scale reservoir connectivity for the subsurface region. Compartments, connections between compartments, and connection properties are determined and the compartments within the subsurface region are interpreted based on production data. Fluid properties and fluid distribution within the subsurface region are each analyzed based on production data. A production time scale fluid connectivity model of compartments, connections, and connection properties is built based on production data and a reconciliation of the baseline reservoir connectivity model with the production data.

Implementations of this aspect may include one or more of the following features. For example, production data may be acquired from at least one well within the subsurface region. Recoverable hydrocarbons may be estimated based on the production time scale reservoir connectivity. Uncertainties within the connectivity models may be evaluated based on preproduction and production data. A multiscenario interpretation of at least one of a compartment, connection, and connection property may be built based on evaluating uncertainties within the connectivity models. Analyzing geologic time scale reservoir connectivity for the subsurface region and developing a baseline reservoir connectivity model based on the geologic time scale reservoir connectivity for the subsurface region are each based on preproduction data. The multiscenario interpretation may be based on preproduction and production data. Analyzing fluid distribution may include evaluating production start-up fluid contacts, and documenting fluid contacts with respect to any inferred baseline conditions. Analyzing fluid distribution may include evaluating effectiveness of inferred connections based on downhole monitoring data. Analyzing fluid distribution may include evaluating well test and interference test data, and reconciling single-well drainage volume, barrier, and baffle inferences with various interpreted, production scenarios. Analyzing fluid distribution may include interpreting fluid compositional changes based on time-lapse geochemistry.

Building multiscenario interpretations may include establishing steady-state system fluid exits using production data. Building multiscenario interpretations may include establishing compartment exits and paths to system fluid exits using production data. Building multiscenario interpretations may include identifying interpreted elements that control fluid contacts, and documenting associated uncertainties with interpreted elements. Building multiscenario interpretations may include evaluating fluid pressure evolution, and reconciling cumulative mer well production data with fluid contacts and pressure evolution. Building multiscenario interpretations may include reconciling any changes in chemistry of produced fluids with the multiscenario interpretations of compartments, connections, and/or fluid properties. Building multiscenario interpretations may include interpreting saturation and pressure changes based on 4D seismic data.

Testing and refining of scenarios may include predicting a magnitude of any change in a multiscenario interpretation for a selected point in production and with respect to a baseline condition, and displaying the magnitude of the change. Testing and refining of scenarios may include building compartment specific well-log cross sections summarizing available data and deviations from inferred pressure and contact baselines. Testing and refining of scenarios may include building a connectivity diagram that documents compartments, connections and connection properties, and fluid exit paths for the subsurface region. At least one of interpreted surfaces, contact relationships, compartment boundaries, spill and breakover are refined based on three dimensional (3D) views of the subsurface region. Testing and refining of scenarios may include building a connectivity diagram that documents compartments, connections and connection properties, and fluid exit paths for the subsurface region. Testing and refining of scenarios may include constructing multiple working scenarios and propagating dependencies for the scenarios. Multiple working scenarios may be developed and analyzed to yield ranked and unranked suites of internally consistent connectivity conceptual models. Production data for a well within the subsurface region may be acquired, e.g., through a data acquisition component.

In another general aspect, a method for analyzing hydrocarbon production data from a subsurface region includes analyzing geologic time scale reservoir connectivity and production time scale reservoir connectivity for the subsurface region. Compartments are interpreted, fluid properties analyzed, and fluid distribution analyzed to analyze geologic time scale and production time scale reservoir connectivity. A reservoir connectivity model is built based on the geologic time scale and production time scale reservoir connectivity for the subsurface region. The reservoir connectivity model includes a plurality of production scenarios each including reservoir compartments, connections, and connection properties. Each of the production scenarios is tested and refined based on production data for the subsurface region.

In another general aspect, a tangible computer-readable storage medium having embodied thereon a computer program configured to, when executed by a processor, generate a geophysical model of a subsurface region based on an analysis of hydrocarbon production data from the subsurface region, includes one or more code segments configured to analyze geologic time scale reservoir connectivity and production time scale reservoir connectivity for the subsurface region, including to interpret potential compartments, analyzing fluid properties, and analyzing fluid distribution. The contains one or more code segments configured to build a reservoir connectivity model based on the geologic time scale and production time scale reservoir connectivity for the subsurface region, wherein the reservoir connectivity model includes a plurality of production scenarios each including reservoir compartments, connections, and connection properties, and to test and refine each of the production scenarios based on production data for the subsurface region.

The connectivity model(s) may be interpreted to determine a formation as potentially hydrocarbon bearing. A well or wells may be drilled to the formation interpreted in the connectivity model as potentially hydrocarbon bearing. Hydrocarbons may then be produced from the well, and production data may be obtained from the well. In-place hydrocarbons may be estimated based on the geologic time scale reservoir connectivity. Production data may be used to optimize the initial model(s).

Implementations of this aspect may include one or more of the following features. For example, the medium may include one or more code segments configured to estimate recoverable hydrocarbons based on the production time scale reservoir connectivity. The medium may include one or more code segments configured to estimate in-place hydrocarbons based on the geologic time scale reservoir connectivity.

In another general aspect, a method for producing hydrocarbons from a subsurface region includes analyzing geologic time scale reservoir connectivity and production time scale reservoir connectivity for the subsurface region. Analyzing geologic time scale and production time scale reservoir connectivity includes interpreting compartments, analyzing fluid properties, and analyzing fluid distribution. A reservoir connectivity model is built based on the geologic time scale and production time scale reservoir connectivity for the subsurface region. The reservoir connectivity model includes a plurality of production scenarios each including reservoir compartments, connections, and connection properties. Each of the production scenarios is tested and refined based on production data for the subsurface region. An ultimate recovery amount of hydrocarbons from the subsurface region is estimated based on the production time scale reservoir connectivity.

Implementations of this aspect may include one or more of the following features. For example, the connectivity model may be interpreted to determine a formation as potentially hydrocarbon bearing. A well may be drilled to the formation interpreted in the connectivity model as potentially hydrocarbon bearing. Hydrocarbons may be produced from the well and production data may be obtained from the well. In-place hydrocarbons may be estimated based on the geologic time scale reservoir connectivity.

DETAILED DESCRIPTION

The techniques presented hereinafter generally relate to the analysis of the connective quality of a subsurface region, e.g., a subsurface hydrocarbon reservoir and/or regions within the subsurface hydrocarbon reservoir. The techniques presented hereinafter also relate to reservoir connectivity analysis (RCA), e.g., a refined series of analyses and approaches to integrate structural, stratigraphic, and fluid pressure and composition data into a permissible set of scenarios of fluid contacts and pressures. The present inventors have developed connectivity analysis techniques to investigate field compartments and associated connections within a reservoir both preproduction and after production starts, e.g., at any point in time before and after hydrocarbons have initially been produced from the reservoir. Specifically, the present inventors have integrated reservoir connectivity analysis techniques with production data to dynamically analyze reservoir connectivity.

Figure 1A:
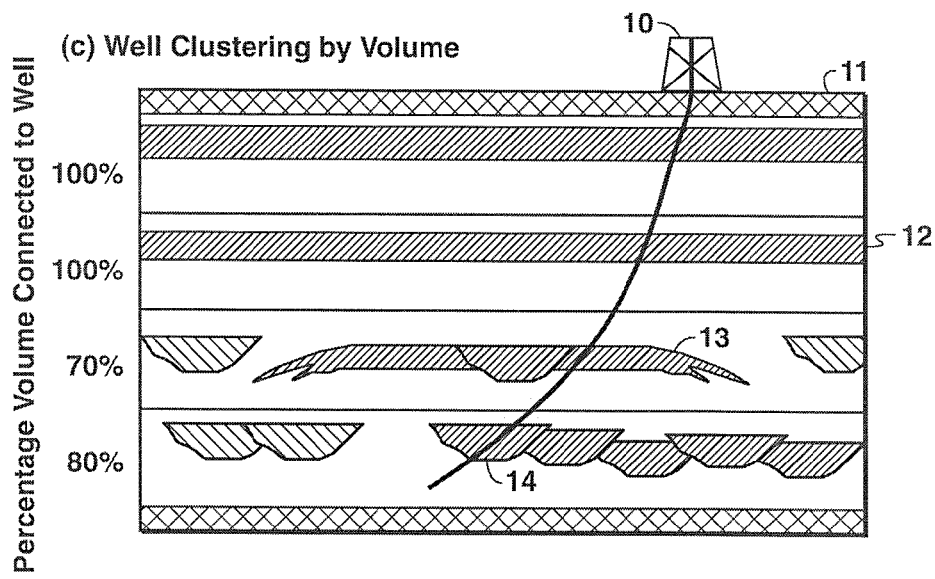
FIG. 1A is a graphical view of a single well in relationship to a reservoir in terms of percentage of reservoir volume connected to the well.
Figure 1B:
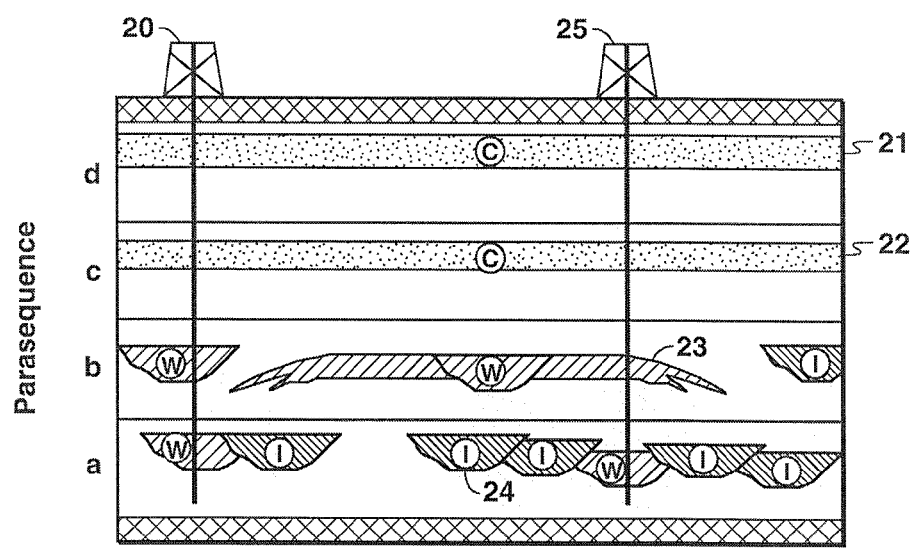
FIG. 1B is a graphical view of a plurality of wells in relationship to a reservoir in terms of percentage of reservoir volume connected to the respective wells.

Reservoir connectivity, and its inverse, compartmentalization, is a growing area of petroleum industry research and business application. Referring to FIGS. 1A-1B, connectivity has often been defined relative to an entity, such as a well or set of perforations in a reservoir. See, for example, "Sequence stratigraphic-based analysis of depositional architecture-a case study from a marginal marine depositional setting;" Ainsworth, R. B., 2005, Petroleum Geoscience, v. 11, p. 257-276. In FIG. 1A, connectivity is expressed relative to a single well 10, and also with respect to one or more layers or regions 11, 12, 13, 14 within a reservoir(s). Connectivity is expressed in terms of reservoir volume connected to the well 10, e.g., 100% of reservoir volume in region 11, 100% of reservoir volume in region 12, 70% of reservoir volume in region 13, and 80% of reservoir volume connected to the well in region 14. In FIG. 1B, connectivity is expressed relative to a set of wells 20, 25, and with respect to one or more layers or regions 21, 22, 23, 24 within a reservoir(s). Connectivity is expressed in terms of reservoir volume connected to each well 20, 25, e.g., 50% of reservoir volume connected to each well 20, 25 in region 21, 50% of reservoir volume connected to each well 20, 25 in region 22, 10% and 70% of reservoir volume connected to each well 20, 25, respectively, in region 23, and 20% and 60% of reservoir volume connected to each well 20, 25, respectively, in region 24.

Figure 2A:
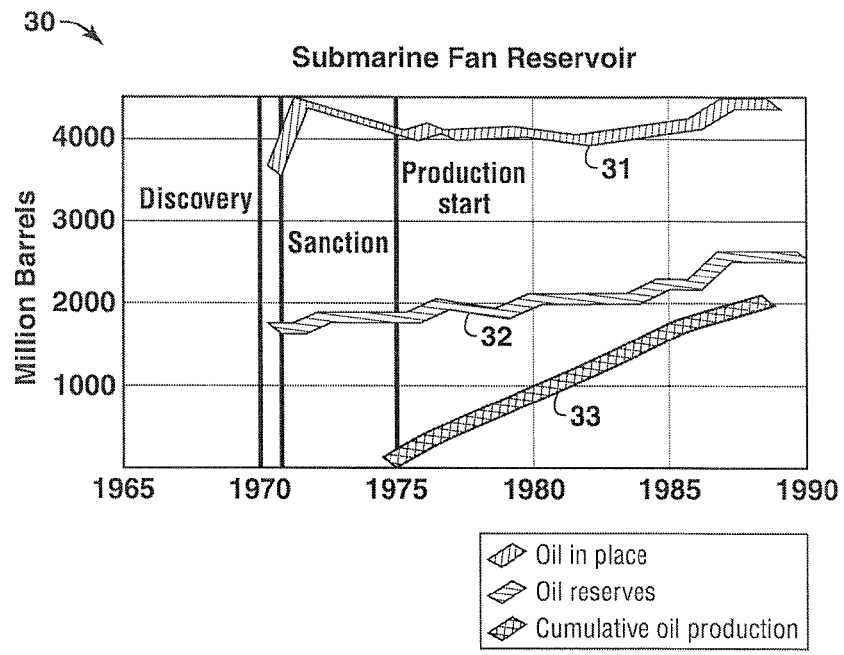
FIG. 2A is a graphical view of a submarine fan reservoir in terms of estimated oil in place, oil reserves, and cumulative oil production over time.
Figure 2B:
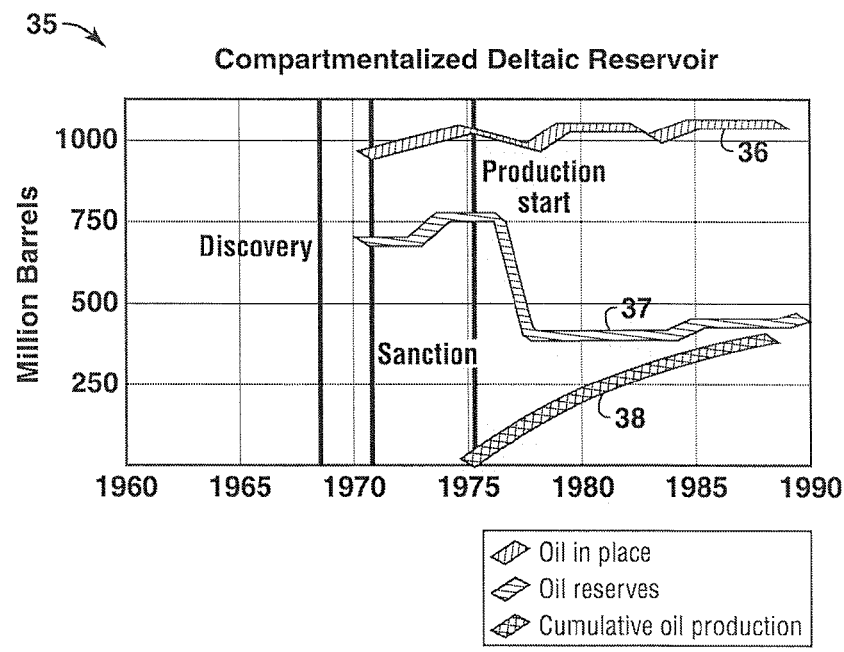
FIG. 2B is a graphical view of a compartmentalized deltaic reservoir in terms of estimated oil in place, oil reserves, and cumulative oil production over time.

Others have utilized reservoir connectivity indexes, e.g., using a set of often subjectively defined criteria to gauge how problematic a field is to develop or exploit. Referring to FIGS. 2A-2B, a graphical view 30 of a reservoir demonstrating high connectivity, e.g., a submarine fan reservoir in FIG. 2A, and a graphical view 35 of a reservoir demonstrating low connectivity (high compartmentalization), e.g., a compartmentalized deltaic reservoir in FIG. 2B, each demonstrate how connectivity can affect actual recoverable reserves over time. See, for example, "Managing Uncertainty in Oilfield Reserves," Schlumberger, 2004, Middle East Well Evaluation Review: Volume 12 http://www.slb.com/content/services/resources/mewr/mewr12.asp. Although a connectivity metric is not relied upon in FIGS. 2A-2B, connectivity is deduced by characterizing the reservoir in terms of estimated oil in place, ultimate oil recovery (reserves), and cumulative oil production. For example, the view 30 of the submarine fan reservoir includes oil in place 31, recoverable reserves 32, and cumulative oil production 33 in millions of barrels versus time. As seen in FIG. 2A, the highly connected reservoir demonstrates consistently high, in fact, slightly increasing, annual recoverable reserves 32 over time. Referring to FIG. 2B, the view 35 of the compartmentalized deltaic reservoir 35 includes oil in place 36, recoverable reserves 37, and cumulative oil production 38 in millions of barrels versus time. In contrast to the reservoir depicted in FIG. 2A, the poorly connected reservoir (FIG. 2B) demonstrates a substantial dropoff in recoverable reserves soon after production was initiated. Although the estimated oil in place 36 had not changed, the amount of recoverable reserves 37 dropped as production commenced, e.g., the poorly connected reservoir is suggested to result from isolated compartments of oil that proved to be inaccessible during production.

However, gas, oil, and water fluids in channelized or faulted reservoirs can create complex reservoir plumbing relationships, which if properly understood, can be used to better define the connectivity of a subsurface region than previous techniques, e.g., FIGS. 1A-1B, 2A-2B. For example, variable hydrocarbon contacts can develop when some, but not all, fluids are in pressure communication. The present inventors rely upon a unique reservoir connectivity analysis (RCA), which provides the basis for fluid contact and pressure scenarios at all business stages, allowing the creation of fluid contact and segmentation scenarios earlier in an exploration or development setting, and the identification of by-passed pays or new exploration opportunities in a production setting. A set of permissible scenarios of the full fluid fill/displacement/spill pathways of a hydrocarbon accumulation, including single or multiple reservoir intervals, is defined by combining conventional structural and fault juxtaposition spill concepts with an appreciation of fluid breakover, e.g., contacts controlled by spill of pressure-driven, denser fluid, like water over a dam; and capillary leak, e.g., to define the ratio of gas and oil where capillary gas leak determines the gas/oil/content (GOC).

Figure 3:
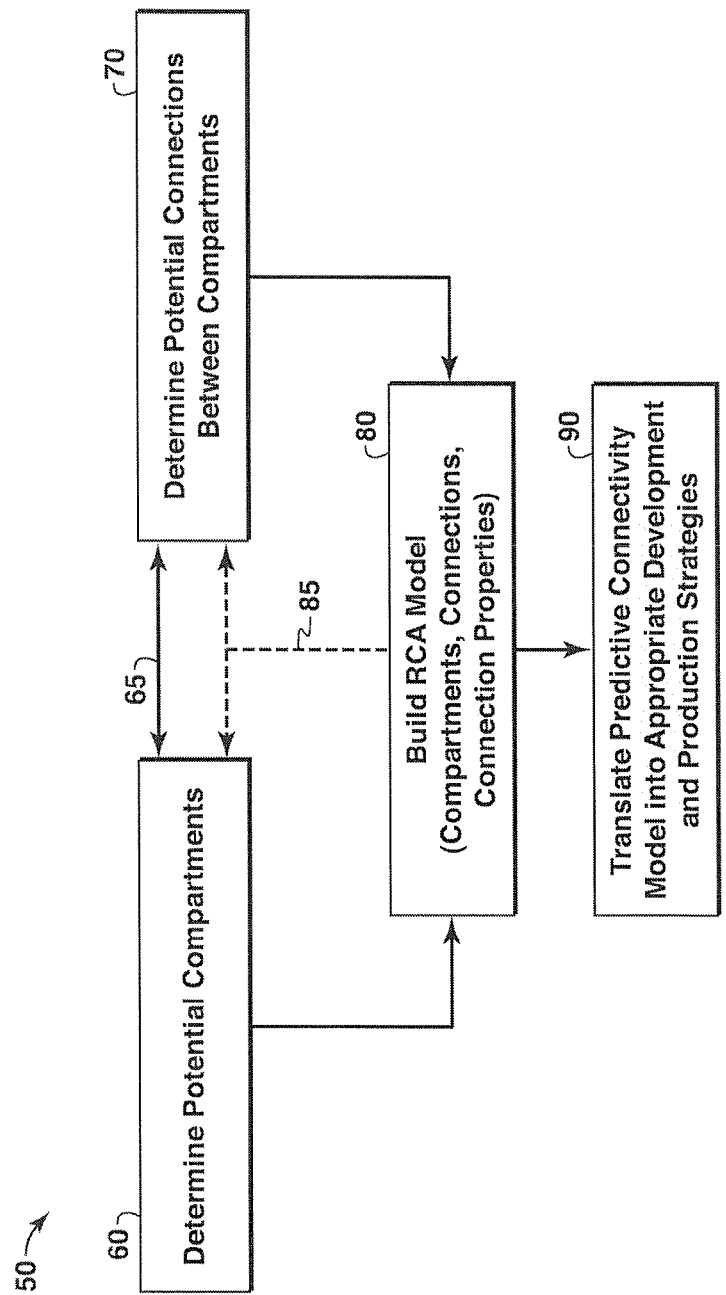
FIG. 3 is a flowchart of an exemplary process for modeling reservoir connectivity.

Referring to FIG. 3, an exemplary RCA process 50 for modeling reservoir connectivity includes three basic components. The RCA process 50 includes a determination of potential compartments 60, a determination of potential connections between the compartments 70, and building an RCA model 80 which includes compartments, connections, and/or connection properties. The RCA model can then be used for various development and production strategies 90, e.g., determining well placement and/or predicting hydrocarbon production based on one or more production scenarios. For example, "Reservoir Connectivity Analysis—Defining Reservoir Connections & Plumbing," SPE Middle East Oil and Gas Show and Conference, by Vrolijk, P. et al., 2005, Kingdom of Bahrain #93577-MS describes exemplary features of an RCA process.

Figure 4A:
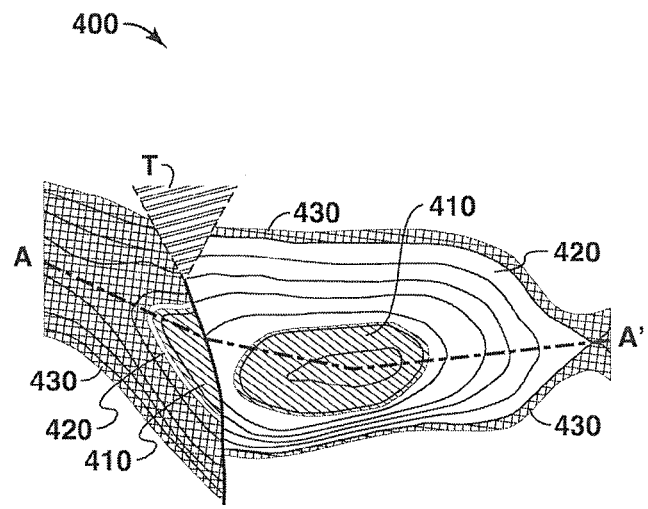
FIG. 4A is an elevation map of a faulted and folded reservoir.
Figure 4B:
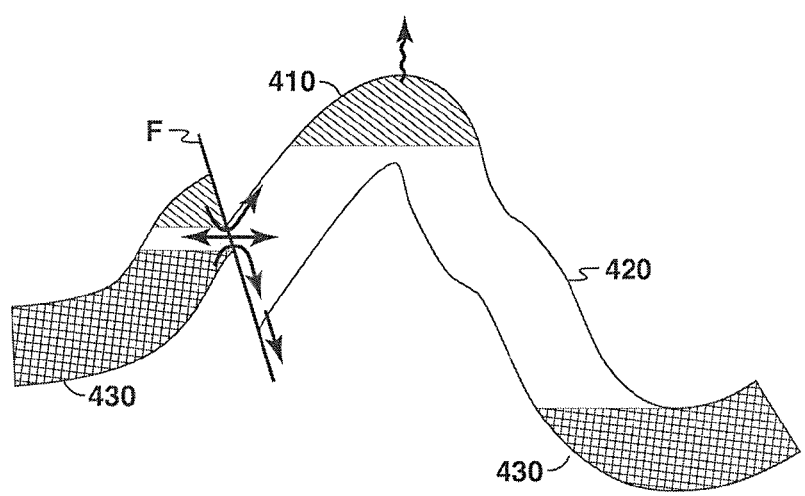
FIG. 4B is a cross-sectional view of the faulted and folded reservoir taken along line A-A' in FIG. 4A.
Figure 4C:
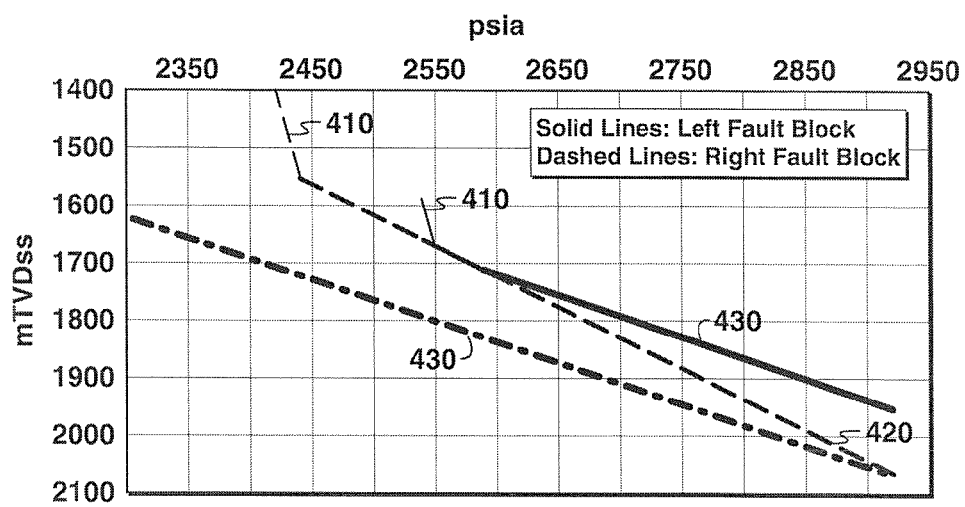
FIG. 4C is a pressure-depth plot of the faulted and folded reservoir of FIG. 4A.

The determination of potential geologic and fluid compartments 60 includes a determination of geologic and fluid compartments. Specifically, compartments arise through the interactions of stratigraphic and structural geometries with the buoyant fluid contained within them. Compartments are connected through stratigraphic or structural leak or spill features and are defined in the context of those connections. Referring to FIGS. 4A-4C, geologic compartmentalization involves a consideration of the fluids that the compartments contain. Compartment containers, defined by geology, that contain two or three buoyant fluids may allow continuity of one or two fluids while segregating other fluid(s). In the example of FIGS. 4A-4C, a faulted and folded reservoir 400 containing gas 410, oil 420 and water 430 is described in different manners.

FIG. 4A is an elevation map of a faulted and folded reservoir 400. FIG. 4B is a cross-sectional view of the faulted and folded reservoir 400 taken along line A-A' in FIG. 4A. FIG. 4C is a pressure-depth plot of the faulted and folded reservoir 400 of FIG. 4A. Three leak types developed in this cross-section include: (1) spill of oil 420 from main (right) fault F block through synclinal spill, and spill of gas 410 through fault F juxtaposition window from W (left) fault block to main (right) fault block; (2) capillary leak of gas 410 through crest of main (right) fault F block; (3) breakover of overpressured water 430 through bottom of fault-juxtaposition window and escape out of plane of section along bottom of reservoir 400. Referring to FIG. 4C, the pressure-depth plot illustrates separate aquifers and gas caps in each fault block. An oil column is common through a reservoir connection established at fault F. Separate aquifers are supported by fault F that separates the reservoir 400 toward bottom of map (FIG. 4A), but since fault F tips out in reservoir 400 toward the top, a cemented reservoir (identified by triangle T) is inferred to explain observation of pre-production offset in aquifer pressures. Wells located near the triangle T indicate development of a tight, low permeability reservoir.

Figure 5A:
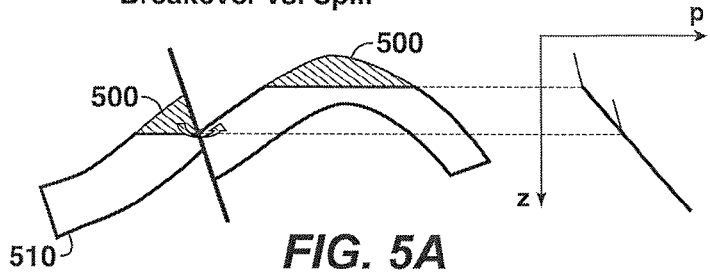
FIG. 5A is a cross-sectional and pressure-depth definition of a structural spill.
Figure 5B:
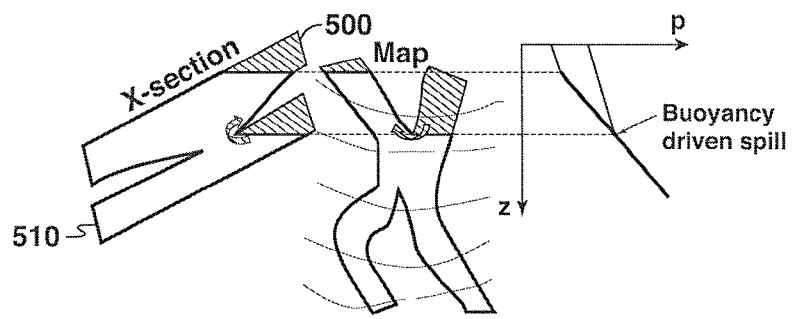
FIG. 5B is a cross-sectional, map, and pressure-depth definition of a stratigraphic spill.
Figure 5C:
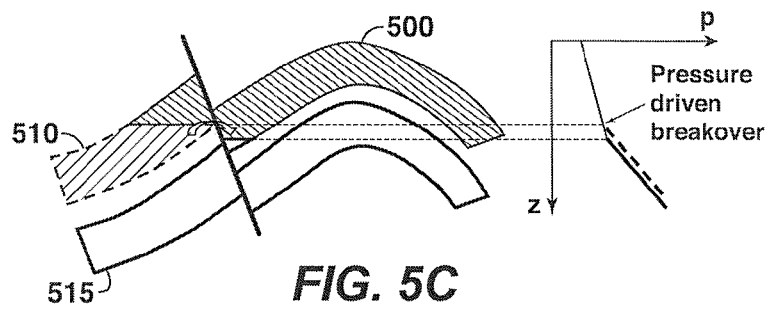
FIG. 5C is a cross-sectional and pressure-depth definition of a structural breakover.
Figure 5D:
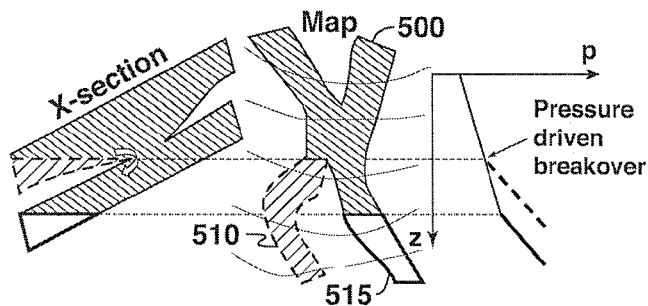
FIG. 5D is a cross-sectional, map, and pressure-depth definition of a stratigraphic breakover.

As seen in FIGS. 4A-4C, complex contact relations arise for routine geologic geometries. Specifically, as seen in FIGS. 4A-4C, a spill is an escape of the more buoyant fluid at a break or cusp in the topseal, and breakover is the loss of a denser fluid driven by overpressure at a break or saddle in the baseseal. Referring to FIGS. 5A-5D, various definitions of structural and stratigraphic spills and breakovers are also possible. FIG. 5A is a cross-sectional and pressure-depth definition of a structural spill. FIG. 5B is a cross-sectional, map, and pressure-depth definition of a stratigraphic spill. In a spill, a less dense fluid 500 is driven by fluid buoyancy, and stratigraphic leaks are created by vertical or lateral reservoir amalgamation. FIG. 5C is a cross-sectional and pressure-depth definition of a structural breakover. FIG. 5D is a cross-sectional, map, and pressure-depth definition of a stratigraphic breakover. In breakover, a denser fluid leaks 510, 515, e.g., is driven by overpressure. For example, the buoyant oil column and aquifer overpressure. The stratigraphic examples (FIGS. 5B and 5D) are defined for channelized reservoirs and emphasize the role of vertical and lateral channel amalgamation in reservoir connectivity.

At an early stage in an RCA analysis, as many potential compartments as possible are properly identified by analyzing geologic geometries. For example, a single reservoir interval in a simple faulted anticlinal closure can have a large number of potential compartments. As the analysis proceeds, there are many opportunities to combine compartments, and the combination or reduction in potential compartments is computationally more efficient than introducing new compartments as additional data is incorporated. Another aspect of determining potential compartments 60 is a determination of fluid compartments.

Figure 6:
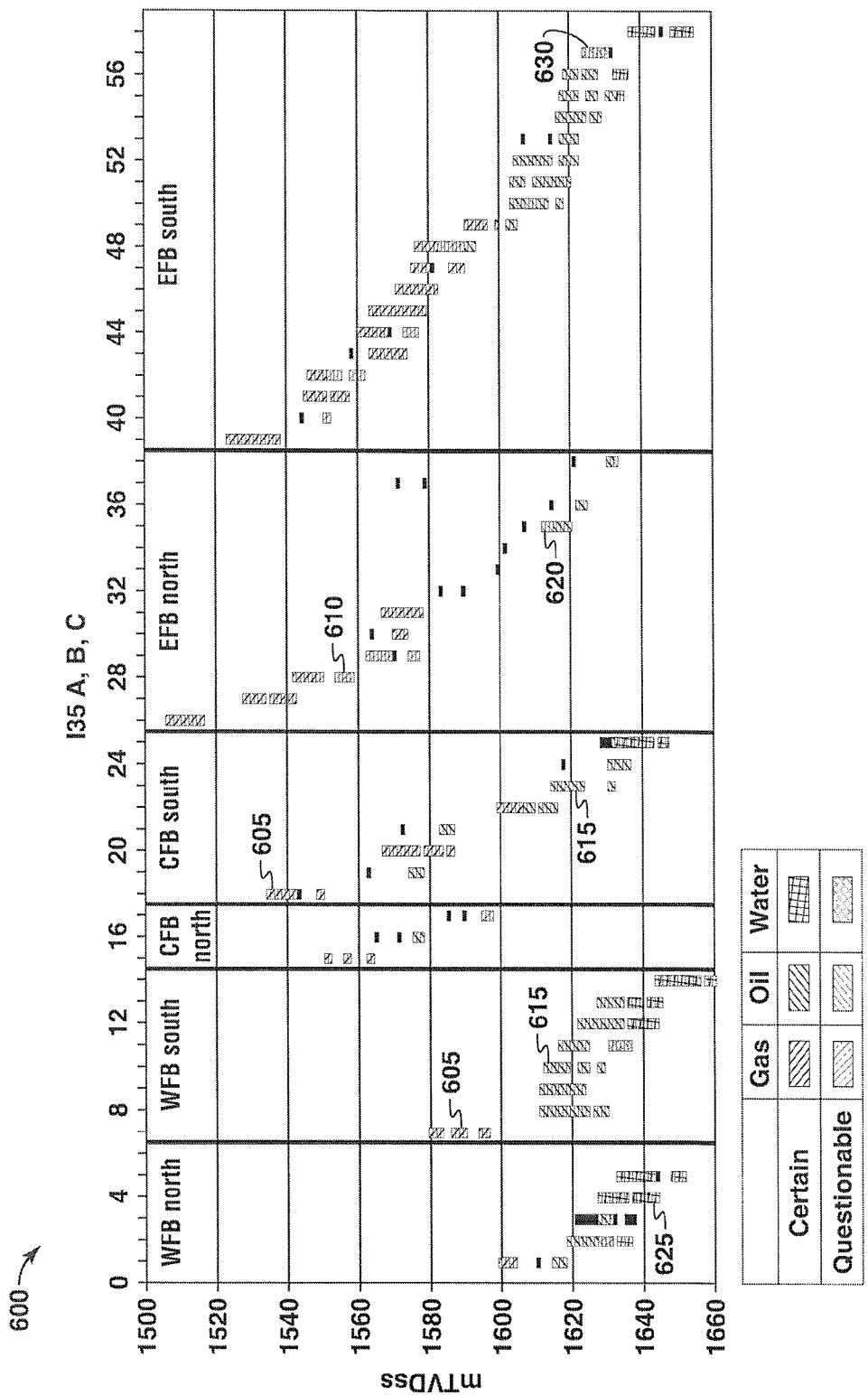
FIG. 6 is an exemplary stick plot of fluid observations in individual wells plotted versus depth.

Referring to FIG. 6 an initial fluid evaluation is undertaken to augment compartment definitions, e.g., fluid compartments. FIG. 6 is an exemplary stick plot 600 of fluid observations in individual wells (columns) plotted versus depth in meters, true vertical depth sub sea (mTVDss). For example, fluid-type distributions are compiled based on conventional wireline log analysis in the context of the first-pass compartment definition, e.g., according to reservoir interval, fault block, and structure flank. An element of this analysis shared with all other analytical component steps in RCA is documentation of interpretation uncertainty. For example, where fluid type interpretation is ambiguous, e.g., due to thin beds or fluid types, a preferred interpretation is recorded but alternative interpretations are indicated as possible. Bars representing gas observations 605, questionable gas interpretations 610, oil observations 615 questionable oil interpretations 620, water observations 625 and questionable water interpretations 630, may be displayed using differentiating colors or cross-hatching. The individual wells are grouped according to fault block and structure flank for single, connected reservoir interval. Well observations within this compartment assignment should also be consistent.

Analysis of fluid pressure data is one part of this process, and central to the analysis of fluid pressure data is a rigorous determination of subsurface fluid pressure gradients based on reservoir temperature, pressure, and fluid composition and pressure volume-temperature (PVT) properties. The analysis of fluid pressure data is particularly useful for older fields where few or poorer quality pressure data, e.g., strain gauge data, are available, but the analysis is also useful when modern, precise pressure data are available. For example, examples of linear regression through abundant, modern pressure data have been identified that correspond to unrealistic fluid compositions.

Black oil correlation methods are sufficient for defining subsurface fluid pressure gradients with the exception of near-critical or volatile fluid types where such methods are known to fail. Exemplary black oil correlation methods are further described, for example, in McCain, W. D., Jr.: "Reservoir-Fluid Property Correlations—State of the Art," SPERE (May 1991), pp. 266. Linear fluid pressure gradients appear to satisfy most applications, acknowledging the gravity segregation implications of such an approach. As with so many petroleum applications, these simplifying assumptions are made in order to progress to a broader analysis, but these assumptions are tested whenever possible. Specifically, the purpose of the analysis is to achieve internal consistency between pressure data and calculated fluid pressure gradients based on fluid property data.

The determination of potential connections between compartments 70 takes place after potential compartments have been identified 60. However, uncertainties in the determination of potential compartments and connections, and/or a review of the RCA model 80 may inspire iterative determinations of potential connections and compartments, e.g., after connections have been determined, potential compartments and/or connections may be reevaluated in one or more iterative steps 65, 85. The first step in determining potential connections between compartments involves a determination of the geologic connections. Specifically, both structural and stratigraphic connections are developed between reservoir compartments.

Structural connections include fault juxtaposition connections, e.g., reservoir connections established across fault surfaces. The RCA approach assumes that all reservoir juxtapositions are viable connections until proven otherwise. In other words, the effects of a continuous, capillary-sealing fault gouge are only imposed when fluid data requires that interpretation. For example, "Fault-seal analysis using a stochastic multi-fault approach," by James, W. R., Fairchild, W. R., Nakayama, G. P., Hippler, S. J., and Vrolijk, P. J.; AAPG Bulletin (July 2004), pp. 885, describe exemplary fault-seal analysis techniques using a stochastic multi-fault approach. In channelized reservoir environments, reservoir juxtaposition geometries become complex. Accordingly, an evaluation of a fault juxtaposition diagram may reveal how alternative stratigraphic or structural interpretations could lead to different connection geometries. Although the analysis proceeds with a single, deterministic connection geometry, the approach permits alternative connection interpretations should independent data dictate.

Stratigraphic connections develop when intra-reservoir seals either laterally pinch-out or are incised by younger sequences. Accordingly, the distribution of these stratigraphic connections can be mapped and the depth of the top and bottom of these windows can be recorded. The depth limits of both stratigraphic and structural connections define potential spill or breakover controls to be evaluated later in the analysis.

Figure 7:
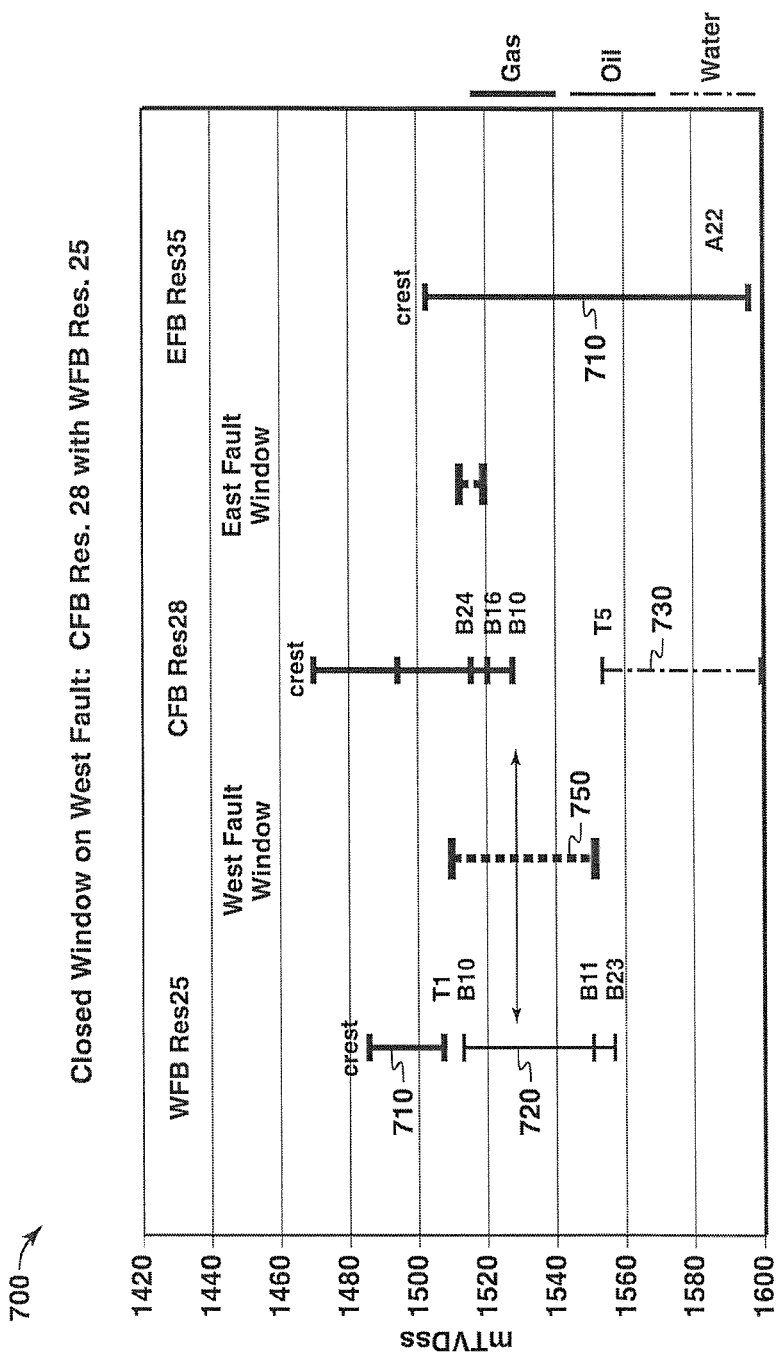
FIG. 7 is a graphical view of an exemplary consistency test between fluid observations and geologic interpretation.

The second component in determining connections 70 includes determining fluid connections. FIG. 7 is a graphical view 700 of an exemplary consistency test between fluid observations and geologic interpretation. Referring to FIG. 7, candidate compartment connections are checked against the compiled fluid data to ensure internal consistency. A fluid distribution is represented with dashed and solid sticks and fault juxtaposition windows 750 are represented with thicker dashed sticks in the stick plot of FIG. 7. Fluid types on either side of a connection window should agree, or the input data need to be re-evaluated to consider alternative interpretations. Similarly, fluid pressure data on either side of a compartment connection window should lie on the same fluid pressure line for each fluid type in contact across that window. Gas 710, oil 720, and water 730 columns are shown.

In most cases, pressure data precision arises as a consideration. Whereas there are a number of potential causes for data uncertainty, the two most common that can be evaluated within a single pressure dataset alone are pressure gauge and depth precision. See, for example, "Correcting for wettability and capillary pressure effects on formation tester," by Elshahawi, H., Samir, M., and Fathy, K.; paper SPE 63075 presented at the 2000 SPE Annual Technical Conference and Exhibition, Dallas, October 1-4. Pressure precision is evaluated by comparing excess fluid pressures for a common fluid column interpreted in pressure communication. In order to specify an excess fluid pressure (like oil excess pressure), a determination of the fluid pressure gradient is required (described above). If high precision pressure data is needed to complete the analysis, pressure measurements may be determined to within a certain margin of error, e.g., 1-2 psi.

Depth uncertainty is evaluated when two fluids are interpreted to be in communication within a single compartment. This requires a single, common free-water level (FWL) for this condition so deviations from a single contact are attributed to depth uncertainty, e.g., depths determined to within 10 ft. The approach used to determine pressure and depth precision may often be iterative. For example, as the approach may be circular, cases are identified where pressure-depth lines are offset from one another. Thus, these are nominal precision limits. Interpretations based on differences within these limits are not made unless the data is demonstrated as being more precise. For differences outside a limit, the analysis may involve rechecking for evidence that the uncertainty might be still larger. For example, a preferred way to find two pressure lines that are actually offset from each other is to find two separate compartments penetrated by the same well. Accordingly, any systematic depth error affects the two sets of measurements just the same. It is easier to establish the pressure-measurement component of error in pressure depth plots this way, than by trying to compare data from a number of different wells, e.g., whose depth errors may vary.

Referring to FIG. 3, the building of the RCA model 80 involves integrating the results from the determinations of potential compartments 60 and connections 70. Once all the compartments and the connections between the compartments are defined to a first order, an attempt is made to integrate them into an RCA model that is consistent with all the available data 80. However, the model generation step 80 often reveals numerous data inconsistencies, so it may be necessary to iterate back 85 through the data analysis steps to reconcile data discrepancies. The goal of the model-building process 50 is to provide a framework that describes how a droplet of oil or gas, each done separately, added to any single compartment displaces oil or gas through a series of compartments to reach a system exit leak (i.e. spill to a shallower trap or seafloor). Once the model is developed, the model can be used to determine one or more production strategies, e.g., well placement to exploit reservoir connectivity and optimize hydrocarbon extraction from a well or wells. A series of assumptions are defined to achieve a description of how the droplet of oil or gas will displace oil or gas through a compartment(s) to reach a system exit leak(s). An explicit definition of these assumptions allows the effects of the assumptions to be tested as alternative scenarios. The result is a rigorously permissible set of interpretations of reservoir connectivity, because model construction requires passing certain logical tests.

Figure 8A:
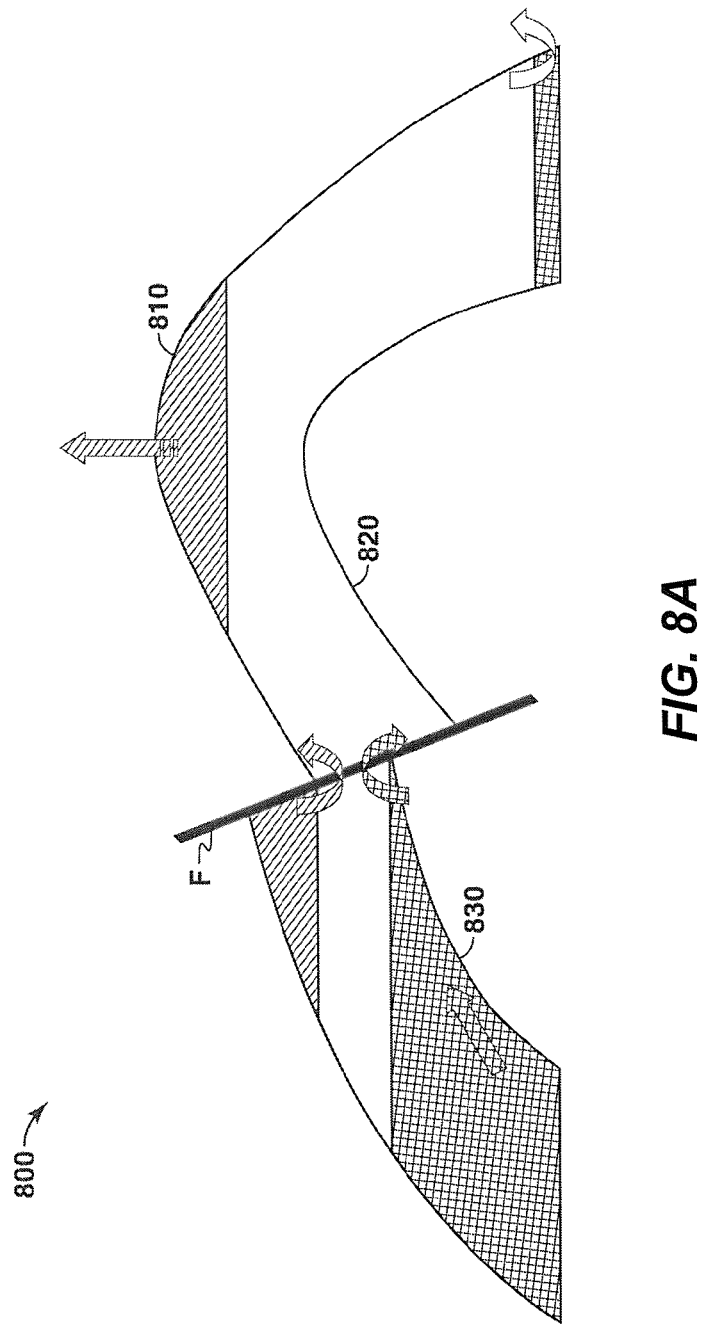
FIG. 8A is a map view of an exemplary connectivity model for a single reservoir.
Figure 8B:
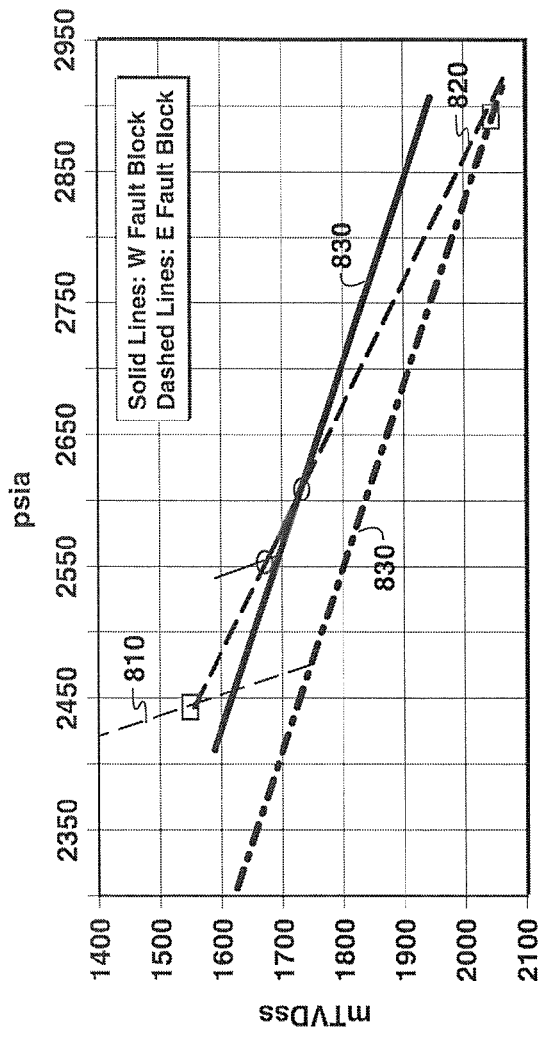
FIG. 8B is a plot of pressure versus depth of the connectivity model of the single reservoir.
Figure 8C:
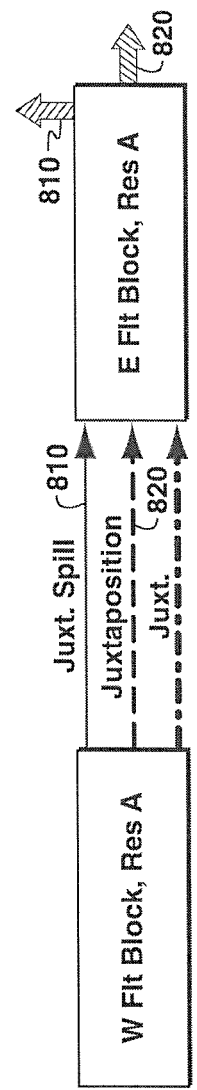
FIG. 8C is a block diagram of the connectivity model of the single reservoir.

Referring to FIGS. 8A-8C, reservoir compartments are depicted as a simple box diagram with some organization according to stratigraphic position, fault block, and flank on an anticlinal structure. The reservoir geometry is simplified in this abstract form to emphasize the connections between them. The connections are portrayed as line segments between compartments with arrowheads describing the spill/leak direction toward the system exit leak. A connection may only point in one direction, a requirement that often leads to identification of data inconsistencies as the connectivity model is developed. A single field may require more than one connectivity model if there are multiple system exit leaks at different stratigraphic levels, even within a single reservoir system.

In FIGS. 8A-8C, a single reservoir interval is broken into two fault blocks, thereby resulting in two compartments. The compartments can be represented as simple boxes (8C), removing most of the geologic details of compartments. The view in FIG. 8C allows focus on reservoir connections, e.g., gas 810, oil 820, and water 830 all use same juxtaposition window F in this model. Gas spills across top of the window F, water 830 spills by breakover along bottom of the window F, and oil 820 is in juxtaposition pressure communication across the window F. System exit leaks for gas 810 and oil 820 are shown by bold arrows and indicate synclinal spill for oil 820 and capillary leak for gas 810. The model satisfies the most stringent requirement for connectivity model, e.g., to describe path of gas 810, oil 820, and water 830 displacement from any compartment to system exit leak point. For example, a bubble of gas 810 added to the W Fault Block compartment will displace gas 810 across fault juxtaposition window, displacing gas 810 through capillary pores of topseal. By these processes, the trap system maintains steady-state arrangement of fluid contacts.

There are two main types of system exit leaks, i.e., (i) a synclinal or fault juxtaposition spill; and (ii) gas or oil capillary leak. Synclinal or fault juxtaposition spill points are map-defined features that are routinely identified on depth structure maps. The spills may have some depth uncertainty, but the fluid contact constraints often help reduce that uncertainty. Capillary leak of oil or gas may also provide a leak control. For fields that contain both oil and gas, capillary leak of gas is required to prevent the field filling to a structural spill point with gas, e.g., assuming access to oil and gas volumes greater than trap volumes. See, for example, "Seal strength vs. trap closure; a fundamental control on the distribution of oil and gas," by Sales John K: Surdam R C (editor) In: Seals, traps, and the petroleum system. AAPG Memoir. 67; Pages 57-83. 1997. For the capillary leak calculations we assume a water-wet system and apply a surface tension model. See, for example, "Surface tension of water-hydrocarbon systems at reservoir conditions," by Firoozabadi, A., and H. J. Ramey; Journal of Canadian Petroleum Technology, (1988), 41. In most cases where a reservoir is filled with both oil and gas, the height of the gas column is determined by capillary leak, and thus the combined buoyancy of a connected oil and gas column defines an empirical gas entry pressure. The gas entry pressure is defined in terms of a rock property, i.e., a pore throat diameter expressed through a Mercury Injection Capillary Pressure value, so gas entry pressure can be calculated for the same rock at other temperature and fluid property conditions.

Figure 9:
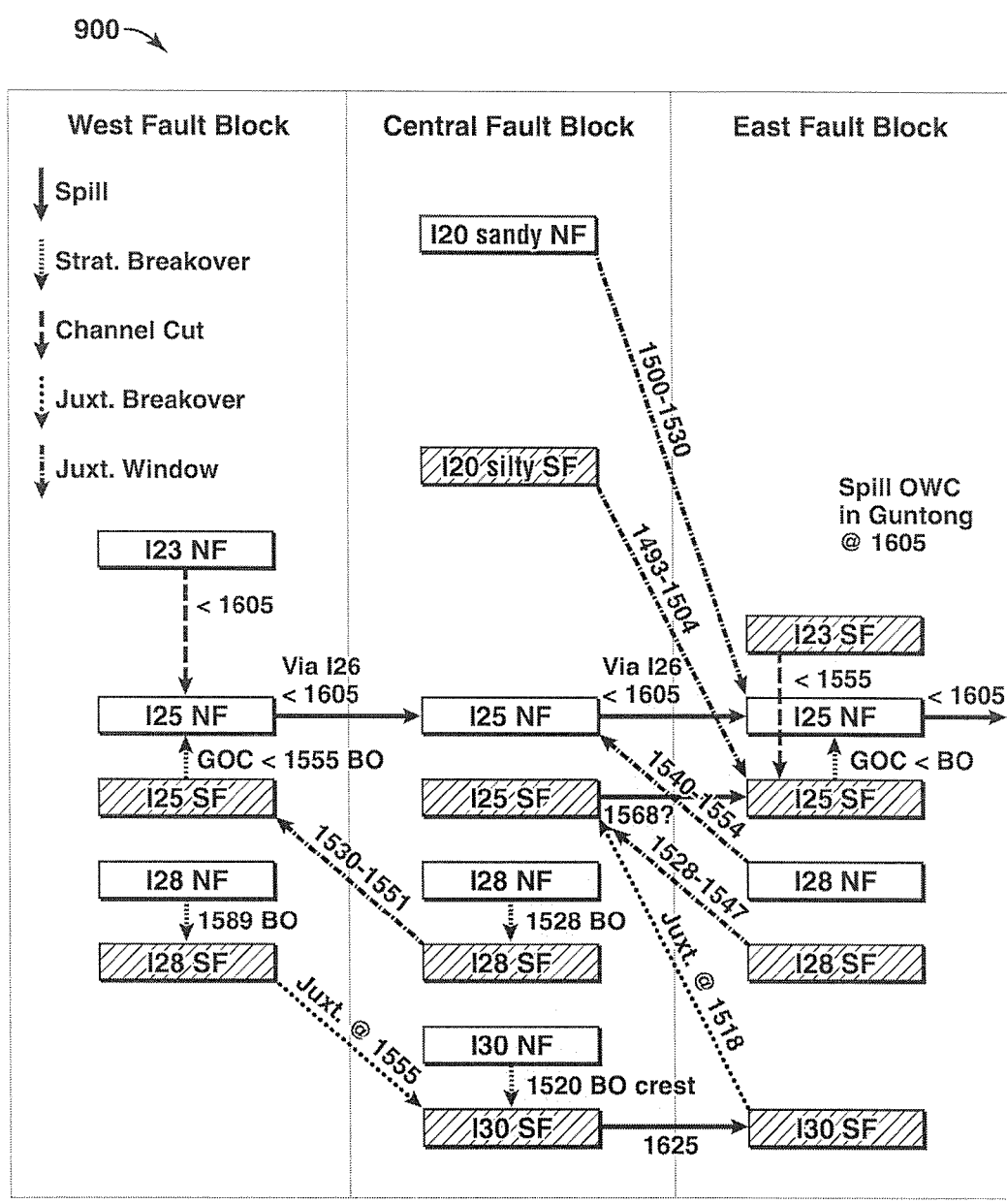
FIG. 9 is a graphical view of an exemplary connectivity model for a reservoir spill.

FIG. 9 is a graphical view of an exemplary connectivity model 900 for a reservoir spill. The connectivity model 900 illustrates reservoir complexity identified with RCA. The various types of compartment connections are color-coded or texture-coded in the upper left-hand key and annotated with pertinent depth information for those connections on connectivity diagram. The boxes are annotated with reservoir interval (e.g., I20) and structural flank (NF=north flank; SF=south flank). For example, adjacent reservoir intervals in many cases follow different paths to reach I25, north flank, east fault block spill to adjacent field. The connectivity model 900 (RCA model) satisfies the requirement that the displacement path of a drop of oil added to any single compartment can be traced to system exit spill with the connectivity model 900. For example, an oil droplet added to I28, NF, central fault block spills across the crest of structure in continuous oil column above the 1528 m breakover (BO) depth to the same reservoir on SF. The oil spills through a fault juxtaposition window in the oil column to I25 reservoir in the west fault block, which spills back across anticline below GOC to I25 on NF. The I25 connects with I26 non-reservoir interval through stratigraphic incision. I26 sand is laterally continuous and allows I25 oil to spill around west and east fault tips to reach I25 NF compartment in east fault block, which in turn spills to adjacent field.

Referring to FIG. 9, once the model 900 is constructed, the leak and spill relations are more apparent. The effort required to draw the connections with single-headed arrows, i.e., within the requirement of a unidirectional path to a system spill or leak that is consistent with variably uncertain geologic and fluid data and interpretations can be computationally intensive. However, the insight gained from achieving that goal is substantial. Consider the divergent connection paths for the adjacent I25 and I28 reservoir intervals on the south flank of the west fault block. These reservoirs follow different routes to reach a common system spill point, yet those same reservoir intervals on the north flank of the east fault block communicate through a common reservoir compartment juxtaposed in the central fault block (I25). This level of insight into reservoir connectivity is useful for understanding otherwise anomalous well results during production. Referring to FIG. 3, the RCA model created in step 80 of process 50 can include one or more of the exemplary models shown and described in connection with FIGS. 8A-8C and FIG. 9, e.g., any one of these models are satisfactory if the connectivity model(s) selected (RCA model) satisfies the requirement that the displacement of a path of drop of oil added to any single compartment can be traced to system exit spill with the connectivity model 800, 900, e.g., any one or more of FIG. 8A, 8B, 8C, and/or FIG. 9.

Figure 10:
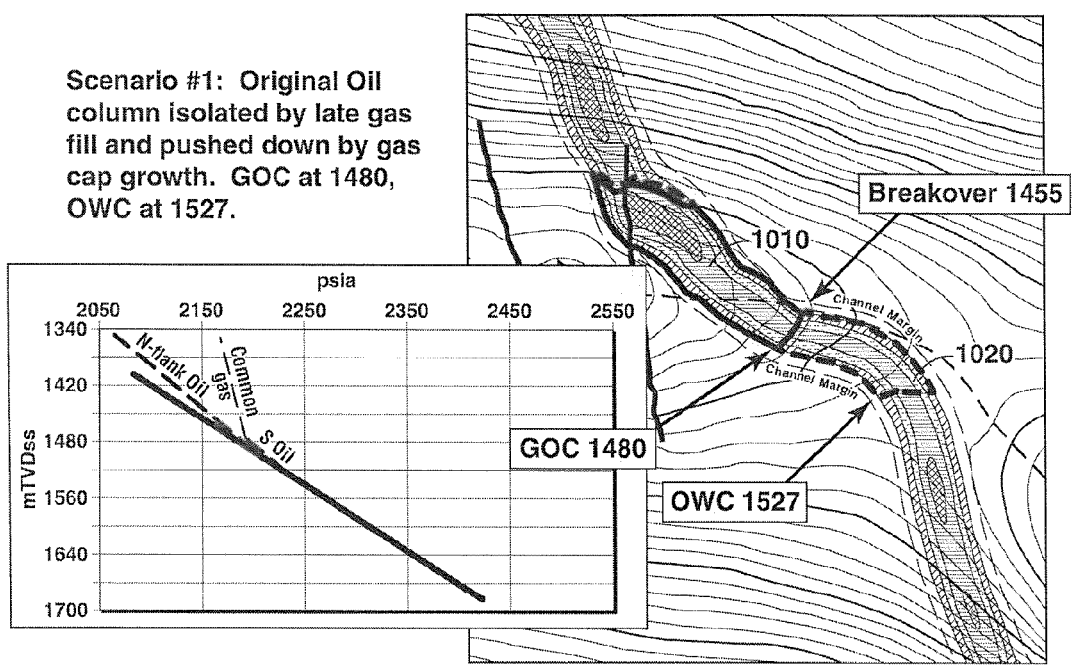
FIG. 10 is a combined map view and pressure v. depth plot of a first exemplary, preproduction scenario.
Figure 11:
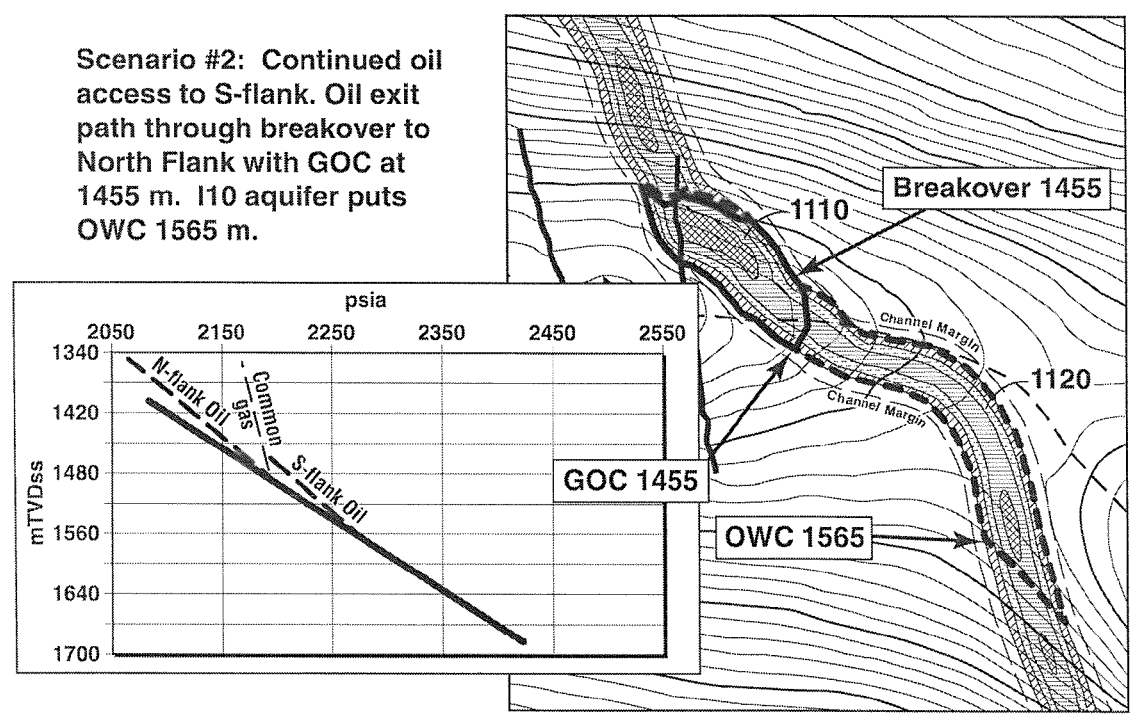
FIG. 11 is a combined map view and pressure v. depth plot of a second exemplary, preproduction scenario.
Figure 12:
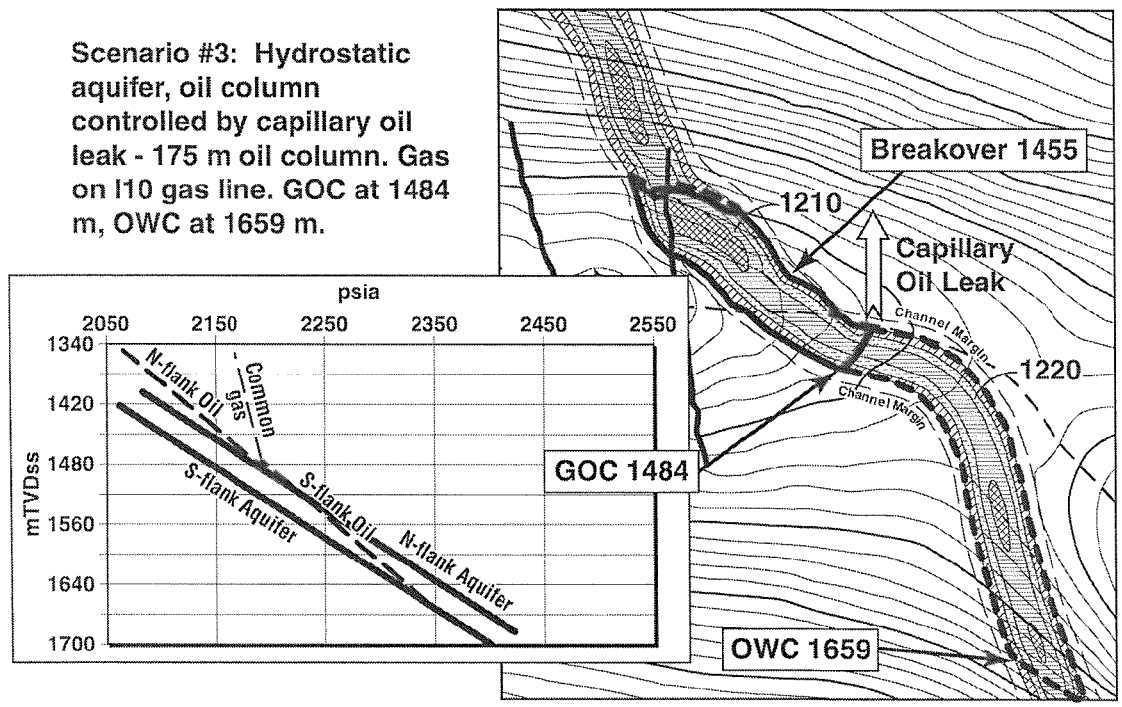
FIG. 12 is a combined map view and pressure v. depth plot of a third exemplary, preproduction scenario.

Referring to FIG. 3, one or more RCA models 800, 900 is utilized to translate the predictive connectivity model(s) into appropriate development and production strategies 90. FIG. 10 is a combined map view and pressure versus depth plot of a first exemplary, preproduction scenario. FIG. 11 is a combined map view and pressure versus depth plot of a second exemplary, preproduction scenario. FIG. 12 is a combined map view and pressure versus depth plot of a third exemplary, preproduction scenario.

FIG. 10 demonstrates complex contact relations developed for a simple, folded fluvial channel reservoir. Different GOC and OWC depths on N-versus S-flank result from inverted U-tube geometry imposed by combining top, base, and lateral seals. An element in the analysis is recognition of breakover depth at 1455 mss (shallowest depth along down-dip channel margin). Interpreted fault-juxtaposition leak for OWC on N-flank and capillary gas leak at crest of channel define N-flank contacts. Gas 1010 is only fluid in communication across crest of trap. Oil 1020 legs isolated, but aquifer assumed to communicate through a different reservoir interval (not shown). In this scenario, length of S-flank oil column 1020 is determined at moment gas cap expands downward to breakover depth. With further gas 1010 cap expansion, oil 1020 on S-flank no longer has access to juxtaposition leak on N-flank FIG. 11 describes a second scenario variation for the reservoir geometry defined in FIG. 10. Specifically, the assumption of oil 1120 migration timing is relaxed, thereby allowing oil 1120 to migrate into S-flank after gas 1110 cap expands below breakover depth. The oil 1120 fills deeper on the S-flank, displacing GOC upward until oil 1120 reaches breakover depth and spills into the N-flank. The oil 1120 exits through N-flank juxtaposition leak.

FIG. 12 describes a third scenario variation for the reservoir geometry defined in FIG. 10. Specifically, the oil 1220 migration and aquifer pressure assumptions are relaxed in the third scenario. In this case aquifer pressure drops toward aquifer pressure for next younger reservoir. Before that limit is reached, oil 1220 leaks through top seal at GOC for same rock properties defined for capillary gas 1210 leak at crest of reservoir. RCA has been used to better understand the distribution, pressures, and contacts of fluids in petroleum reservoirs, and to use that understanding to evaluate fluids in untested compartments in exploration, development, and production business settings. The production examples are described in this section to illustrate the commercial application of this approach.

Referring to FIG. 10, the first scenario comes from simple reservoir geometry in a field in which a single channel is folded over the nose of an anticline. The north end of the channel is partly offset by a fault that tips out in the channel. Production wells define a gas cap with a thin oil rim on the north flank, and the south flank is untested. Conventional approaches assign the same gas-oil contact (GOC) and oil-water contact (OWC) on the south flank as the north flank. However, the reservoir thickness is recognized in the present technique as much smaller than the structural relief caused by the anticline and that the shale below the reservoir may play a role in how fluids are compartmentalized. In fact, geologic analysis reveals that the OWC on the north flank is controlled by a fault juxtaposition spill to the next higher reservoir interval, and there appears no obstruction to gas communication through the crest of the channel.

Examination of the reservoir geometry reveals a breakover condition at the highest downdip channel margin. The way to appreciate the significance of this geometry is to imagine the reservoir channel filled all the way to the fault juxtaposition leakpoint on the north flank, e.g., which is well below the breakover depth. If the development and growth of a gas cap follows the oil fill, then gas will accumulate first at the highest point on the updip channel margin and expand downward and outward until it reaches the downdip channel margin (breakover). At that position, a wedge of gas isolates oil between the north and south flanks. The two isolated oil columns have the opportunity to evolve independently from this point forward.

As gas cap growth continues, oil on the north flank is displaced out through the juxtaposition leak; the gas cap expands at the expense of the oil leg. However, on the south flank, the oil no longer has access to a leak so gas cap expansion simply displaces the oil column down-dip. The moment the gas cap expands below the breakover depth, the GOCs and OWCs on the two flanks will be different. This relationship is best understood from the pressure-depth plot of FIG. 10. For example, it is clear that a single pressure-depth line defines the gas because the gas communicates across the nose of the anticline. Initially the aquifers on the north and south flank are assumed to share common pressures and communicate through connections established at other reservoir levels.

The two oil columns are defined as separate line segments with the same slope if the oil compositions are assumed to be the same. The length of the oil line on the south flank is defined by the difference in depth of the fault leak point and breakover, e.g., actually the volume of oil defined by those depths is conserved, but the even dip and uniform channel dimensions permit an approximation of constant oil volume by constant oil line length. The crestal depth and capillary seal properties of the overlying reservoir interval and the depth of the fault juxtaposition leak define the height of the oil column on the north flank.

With these constraints and the definition of a common gas column and assumption of a common aquifer, the GOC on the south flank should be higher than on the north flank and the OWC lower. The pressure-depth plot, when used with simple fluid constraints and assumptions and with the benefit of the depth of geometric elements, becomes a useful interpretation tool.

Four assumptions were used to reach the foregoing interpretation. First, gas and oil volumes available to the trap are greater than the trap volume. Second, oil charge filled the trap to the juxtaposition leak point before the gas cap reached breakover. Third, oil charge ended once the gas reached breakover. Fourth, the aquifer pressure on both flanks is the same. Relaxing the first assumption restricts the predictive potential of the approach. If the oil rim on the north flank reflects oil charge rather than spill, then the oil rim on the south flank could be equally thin (or non-existent or thicker) depending on the actual oil charge volume. However, it is often difficult to test these assumptions.

The second assumption defines the order by which oil and gas arrive at the trap. If the gas 1010 cap expanded below breakover and to its capillary limit before oil 1020 charge, then the migration direction becomes important. If oil 1020 migrated up the north channel-flank, then oil would never have had the opportunity to reach the south flank. This results in a gas-water contact (GWC) on the south flank between the GOC and OWC on the north flank. In this field there is independent evidence from other reservoir levels to establish an initial oil 1020 charge and rule out this scenario. In many cases searching for oil-filled fluid inclusions in the gas 1010 cap to help constrain an earlier oil-fill provides a test of this assumption. A basic element of the third assumption is whether oil 1020 charge reached the south flank after the gas 1010 cap reached the breakover depth. This assumption is immaterial on the north flank because the height of the oil 1020 column is determined by capillary gas 1010 leak and the fault juxtaposition spill depth.

Referring to FIG. 11, in the second scenario, if oil 1120 continues to reach the south flank after the gas 1110 cap reaches the breakover depth, then the oil 1120 column can continue to grow until it reaches the breakover depth where it can now spill along the base of the gas 1110 cap to reach the juxtaposition leak point. Appealing to the graphical depiction of this scenario in the pressure-depth plot, it is clear that a breakover-controlled GOC on the south flank corresponds to a much deeper OWC.

Referring to FIG. 12, the third scenario is based on relaxing the assumption of a common aquifer on the north- and south-flanks. The north flank aquifer pressure is slightly above hydrostatic values and above the aquifer pressure in the overlying reservoir. As the impact of lowering the south-flank aquifer pressure is explored while continuing to charge it with oil 1220, the limit on the oil 1220 column is reached when oil 1220 begins to leak through the topseal at the GOC. The oil 1220 entry pressure corresponds to the same rock properties that defined capillary gas 1210 leak at the crest. The scenario defined by both capillary gas 1210 and oil 1220 leak corresponds to the underfilled trap scenario and arises because the interfacial tension in the oil-brine system is always lower than for gas-brine.

Referring to FIGS. 10-12, there are three main points to be taken from these examples. First, complex fluid contacts can arise for even simple reservoir and trap geometries. Second, recognizing that gas filled down below the breakover depth led to the construction of multiple oil column scenarios in the untested, S-flank reservoir compartment. Third, a clear statement of assumptions led to definition of alternative scenarios based on clearly expressed uncertainties.

With this analysis, the RCA technique offers the opportunity to evaluate the S-flank as a new drilling candidate and provides the scenarios to define the range of economic outcomes for pursuing that opportunity. Moreover, any uncertainties are clear, thus offering the opportunity to consider reducing those uncertainties with data collection, e.g., by establishing aquifer pressure on the south flank.

Dynamic Connectivity

Figure 14A:
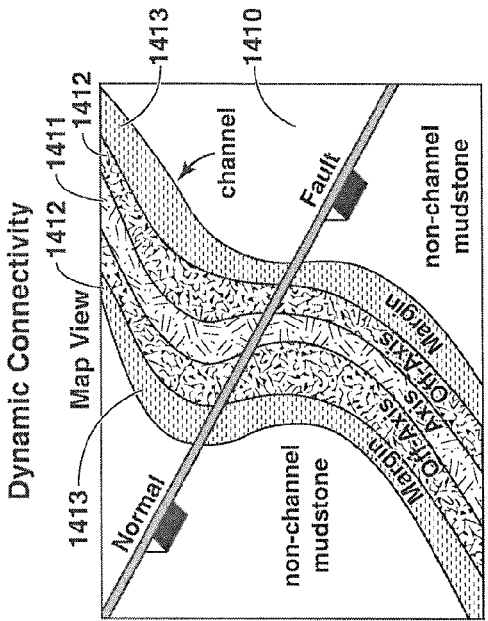
FIG. 14A is a map view of the dynamic connectivity of a subsurface region.
Figure 14B:
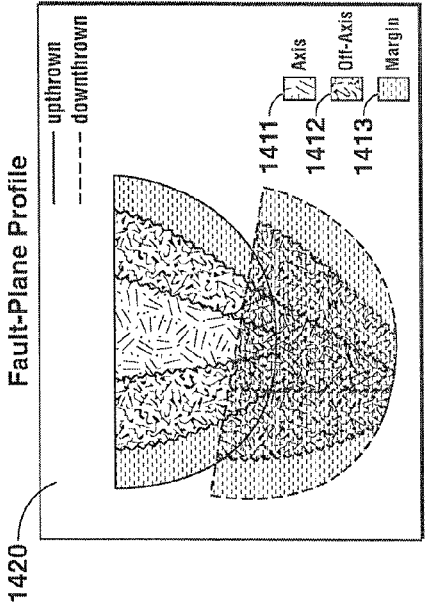
FIG. 14B is a fault-plane profile of the dynamic connectivity of the subsurface region of FIG. 14A.
Figure 13A:
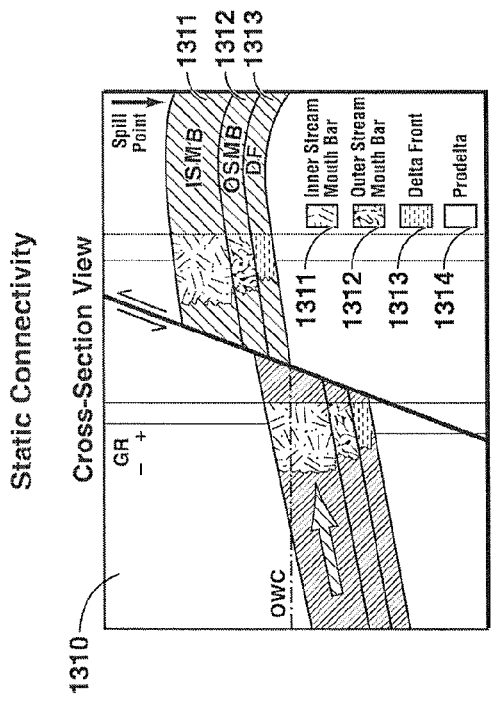
FIG. 13A is a sectional view of the static connectivity of a subsurface region.
Figure 13B:
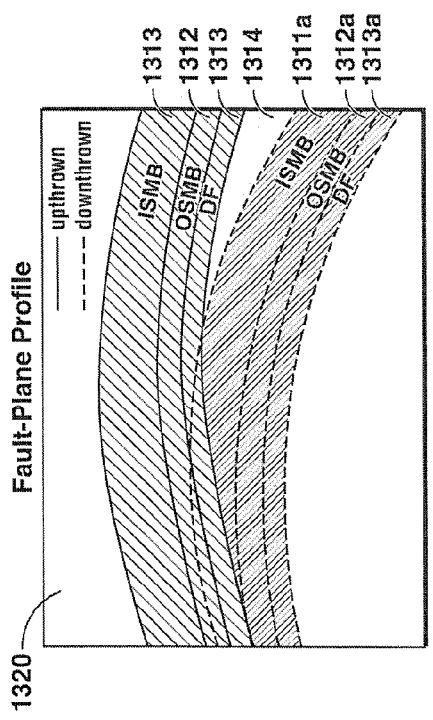
FIG. 13B is a map view of the static connectivity of the subsurface region of FIG. 13A.

FIG. 13A is a sectional view of the static connectivity of a subsurface region 1310. FIG. 13B is a fault plane view of the static connectivity of the subsurface region 1320 of FIG. 13A. FIG. 14A is a map view of the dynamic connectivity of a subsurface region 1410. FIG. 14B is a fault-plane profile of the dynamic connectivity of the subsurface region of FIG. 14A 1420. Referring to FIGS. 13A-13B, on a geologic time scale, fluids leak across any porous sandstone. Referring to FIG. 13A, the subsurface region 1310 includes an inner stream mouth bar 1311, outer stream mouth bar 1312, a delta front 1313, and a prodelta 1314 in the vicinity of a fault plane. Accordingly, fluid contacts are controlled by binary facies. Referring to FIG. 13B, the subsurface region 1310 includes an inner stream mouth bar (ISMB) 1311, outer stream mouth bar (OSMB) 1312, a delta front (DF) 1313, and a prodelta 1314. Upthrown and downthrown bars and fronts are depicted, with downthrown bars and fronts as follows: ISMB 1311a, OSMB 1312a, and DF 1313a. Referring to FIGS. 14A-14B, on a production time scale, fluid movement is often confined to best facies juxtaposition. Therefore, facies differentiation is beneficial in a dynamic connectivity analysis. The map view 1410 of FIG. 14A includes axis 1411, off-axis 1412, margin 1413, and a fault channels. The fault-plane profile 1420 also includes upthrown and downthrown axis 1411, off-axis 1412, and margin 1413 channels.

Referring to FIGS. 13A-B and 14A-14B, RCA is traditionally directed at defining and investigating "static" connectivity, e.g., geologic time scale fluid connectivity. Specifically, static connectivity describes the native state of a field, e.g., prior to production start-up. A traditional RCA technique is particularly useful for evaluating static connectivity, which serves as the basis for a proper assessment of original hydrocarbons in place in a reservoir and prediction of fluid contacts in unpenetrated compartments within the reservoir. The techniques described hereinafter are directed at defining and investigating "dynamic" connectivity, e.g., production time scale fluid connectivity.

Referring to FIGS. 14A-B, dynamic connectivity describes movement of fluids once production has begun. For example, the initiation of production often perturbs the original fluid distributions as pressure and saturation changes proceed in a non-systematic fashion across field compartments. An analysis of dynamic connectivity is therefore advantageous in accurately estimating ultimate recovery from a field. As aforementioned, previous techniques include significant differences in how connectivity is defined, measured, and modeled. For some, connectivity is defined relative to an entity such as a well or set of perforations in a reservoir. Others prefer reservoir connectivity indexes, using a set of often subjectively defined criteria to gauge how problematic a field is to develop or exploit. The present technique utilizes RCA to investigate field compartments and associated connections.

As previously described, a compartment is precisely defined as a trap which has no internal boundaries which allow fluids to reach equilibrium at more than one elevation. Compartment boundaries include sealing faults, channel margins, shale-draped clinoforms, paleokarst fractures and other diagenetic boundaries. The compartments can separate hydrocarbons and aquifers within a field or discovery. The connections between compartments include fault juxtaposition windows, erosional scours between channels, and capillary leakage. Compartment boundaries can also include spill and breakover points, defined on topseal and baseseal maps.

Referring to the aforementioned FIGS. 1A-1B, for some petroleum and service companies, connectivity is defined relative to an entity such as a well or set of perforations in a reservoir. Referring to FIG. 1A, a tabular reservoir penetrated by a single well yields 100% reservoir volume connected to the well, while more discrete, channelized reservoirs show lower connectivity. Referring to FIG. 1B, the present inventors have determined that drilling an additional well decreases the overall connectivity measure in most cases, as the more rapid pressure decline imparted by two wells (other factors being equal) reduces sweep during production. Specifically, the present inventors have determined that a scale-sensitive approach tends to mix time spans, e.g., geologic versus production time scales. The scale-sensitive approach is also very sensitive to the well spacing, completion technique, and pressure maintenance. The present inventors have therefore determined that any accurate connectivity measures should relate instead to the inherent geology of a reservoir and field, e.g., the structural and stratigraphic framework, fluid type and distribution.

Referring to FIGS. 13A-B and 14A-B, the present techniques for analyzing connectivity is to eschew subjective numerical values and let the buoyant fluids tell the modeler what is connected. First, one needs to differentiate between static or geologic time scale fluid connectivity and dynamic or production time scale fluid connectivity. Referring to FIGS. 13A-B, it is well known from field studies that over geologic timescales, buoyancy and capillary forces work to allow lighter fluids like oil and gas to find their way into virtually any water-wet, porous sandstone regardless of quality. The example shows how fluids migrate into the crest of a trap and fill downward, and eventually cross a fault plane where a relatively poor quality (low porosity and permeability) delta front reservoir facies is juxtaposed across the fault from high quality inner stream mouth bar reservoir facies. The migration continues until the spillpoint is reached.

Referring to FIGS. 14A-B, field studies also have demonstrated that understanding reservoir type and quality is useful in understanding dynamic connectivity as well. For example, the 4D seismic response, resulting from either pressure or water saturation changes due to fluid movement, often occurs at the best facies juxtaposition across a fault plane, here in the case of a deepwater channel axis on axis. This differentiation between static and dynamic connectivity forms the basis for two distinctions. Specifically, understanding static connectivity is advantageous in determining accurate, in-place hydrocarbon estimation and dynamic connectivity is advantageous in determining accurate, ultimate hydrocarbon recovery.

Figure 15:
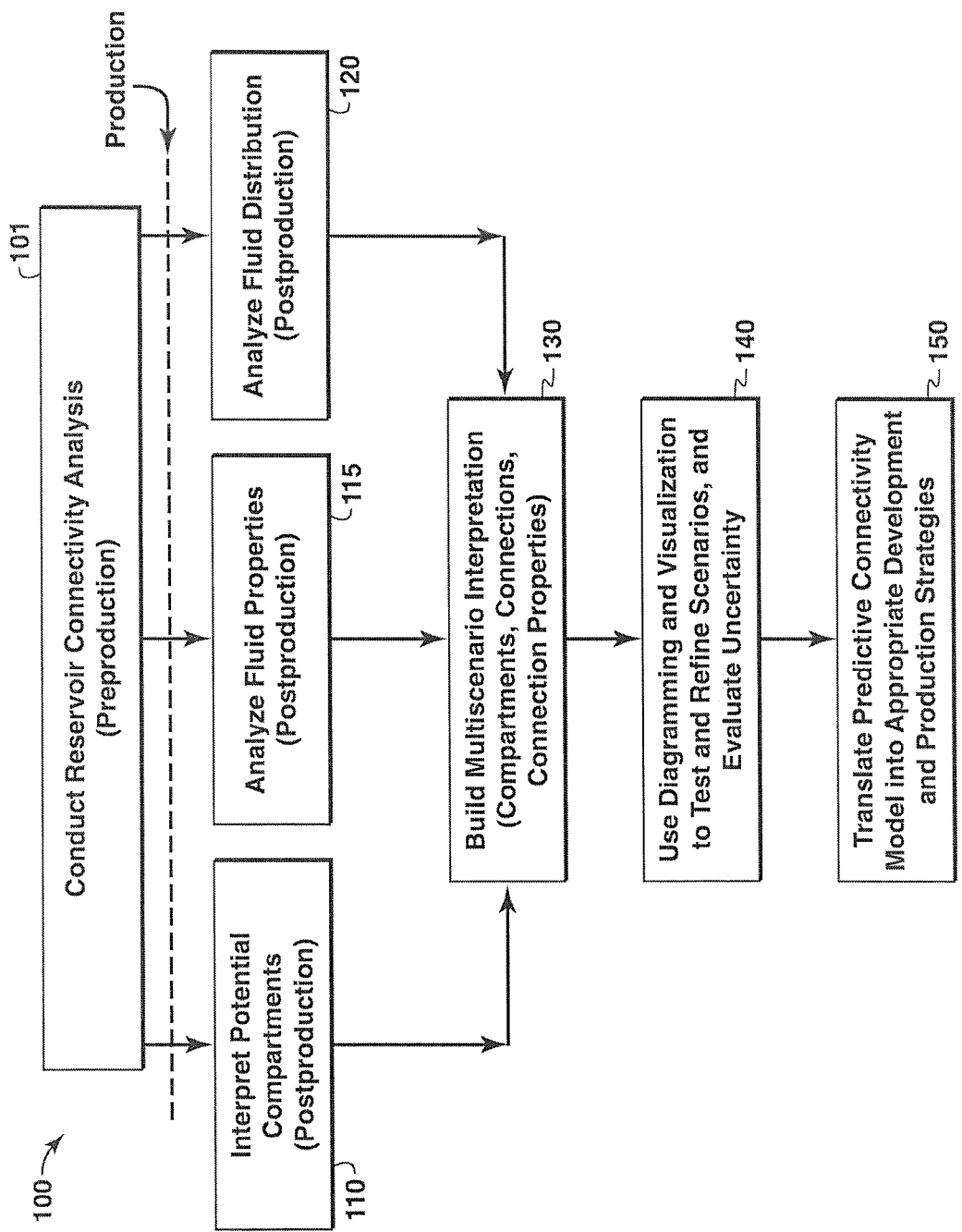
FIG. 15 is a flowchart of an exemplary process for translating predictive static and dynamic connectivity models into development and production strategies.

Referring to FIGS. 15-18, the integration of static and dynamic reservoir connectivity analysis based on both pre-production and production data results in predictive connectivity models that are useful for determining optimum well placement, in-place hydrocarbon estimation, and ultimate hydrocarbon recovery at various production stages (and scenarios). FIG. 15 is a flowchart of an exemplary process 100 for translating predictive static and dynamic connectivity models into development and production strategies. In step 101, a static connectivity model(s) is generated based on the aforementioned techniques described in connection with FIG. 3 through FIG. 14. Specifically, the static connectivity models are generated based on preproduction data, e.g., models are useful in determining in-place hydrocarbon estimation and steady-state connectivity and compartmentalization pre-production. The results of step 101 become the baseline for the remainder of the dynamic process steps of process 100, e.g., postproduction (any point in time after production has begun). Accordingly, process steps 110, 115, 120, 130, 140, and 150 are described hereinafter as taking place postproduction (after the dashed production line shown in FIG. 15). Production data includes any data acquired or sought in connection with the production of hydrocarbons from a subsurface region, e.g., production data may include data and observations from any point after a reservoir is perturbed, e.g., including feedback from the initial drilling of a well(s) and at any point once hydrocarbon production has begun. In addition, process steps 110, 115, 120, 130, 140, 150 involve similar techniques to those described in connection with FIG. 3, and more specifically with the examples shown in FIGS. 4A-4C through FIG. 12. For example, steps 110, 115, 120, 130, and 140 may not necessarily be sequential steps, but part of a larger iterative process as described in connection with FIG. 3 (iterative steps 65, and/or 85).

The process 100 involves the interpretation of potential compartments (postproduction) 110, an analysis of fluid properties (postproduction) 115, and an analysis of fluid distribution 120 (postproduction). The goal is similar to that achieved in process 50 of FIG. 3, e.g., determine potential reservoir compartments and connections. However, in the case of process 100, the compartments and connections also involve a determination of dynamic connectivity (connections, compartments). More specific differences between the dynamic connectivity process 100 of FIG. 15 and the static connectivity process 50 of FIG. 3 will be discussed in greater detail in connection with the examples shown in FIGS. 16-18.

Once process 100 has been initiated and actual production has started, the reservoir connectivity analysis process technique 101 may no longer be based solely on preproduction data, e.g., the process 100 may be used repeatedly over the operating life of the producing field. Specifically, process 100 may then be shifted to a solely dynamic basis, e.g., the baseline becomes an earlier static and dynamic model that may be based on less production data and/or may be baselined to a particular, earlier point in a production timescale. In this case, the dashed production line becomes an earlier point in time in the production life of a subsurface region for subsequent comparison or prediction of production scenarios taking place in the future.

Referring to process 110, like static connectivity, compartments and their connections are defined by the presence of two or three fluids. A compartment is a trap which contains no internal barriers that allow the contact between two fluids, e.g., oil and water, to reach equilibrium at more than one elevation. Within a static compartment, the contact between two fluids settles at a single elevation over geologic time. Water-filled reservoirs are generally not considered "compartments" because they have failed to trap hydrocarbons, as per definition, but for practical reasons may be included in a connectivity evaluation, e.g., associated aquifers.

Compartment boundaries are defined by structural features like faults, stratigraphic features like channel-margins, and the limits of topseal and baseseal. For example, a compartment can be completely bounded by faults or partially bounded by faults with a reservoir pinchout (enclosed reservoir compartment). Faults or reservoir pinchouts may only bound three sides of a compartment, e.g., open reservoir compartment. In some cases, oil may become separated across a fault and a separate gas-oil contact (GOC) and/or water-oil contact (WOC) may develop, thus defining two different compartments. Two other features also represent compartment boundaries. Referring to FIGS. 4A-4C and 5A-5D, spillpoints separate buoyant fluids on structural highs and thus can allow division of compartments containing different hydrocarbon/water contacts, for example. A less well-understood compartment boundary is the breakover point. A breakover point separates denser fluids (e.g. oil below gas, water below oil) allowing development of separate contacts and thus compartments. It is broadly defined as the deepest elevation at which buoyancy forces can trap a relatively heavy fluid below a lighter one. These compartment boundaries are associated with baseseal and are thus best identified from top baseseal maps. Oil and water pressures no longer communicate through the crest of the structure, assuming that there is lateral bounding to prevent the heavier fluid from communicating around the flank of the structure.

The present inventors have also determined that lateral bounding to set up breakover (a type of compartment boundary) is probably more common than most operators assume. Laterally bounding of fluids has a variety of causes, e.g., it can occur due to primary faulting; diagenetic changes, e.g., downdip loss of porosity, presence of impermeable karst towers, contribute to bounding of fluids; channelization in both alluvial and deepwater realms can lead to lateral bounding if the channel margins and overbank are largely impermeable; and even shale-draped delta clinoforms are known to trap and bound fluids.

Dynamic compartments are defined by boundaries that are not necessarily effective barriers to fluid flow over geologic time, but impede flow to the extent that they have a significant impact on contact movement or pressure depletion during production. Data useful for defining dynamic compartmentalization includes fluid-production rates, water cut, downhole pressure, and gas-oil ratio measurements for the development wells. For example, development wells completed in a single zone (no comingling), make it possible to relate a given production response to a single stratigraphic interval. If the development wells are fitted with downhole pressure gauges, pressure data is abundant, and changes in pressure with production are well documented. The pressure data makes it possible to compare fluid pressures between wells throughout their production histories. Therefore, the identification of dynamic compartments can be based on pressure data, in-place and produced volume calculations, and the evolution of gas-oil ratios with time.

With respect to steps 115, 120, the analysis of fluid properties and fluid distribution (both postproduction) are primarily used for determining reservoir connections, e.g., static and dynamic connections. There are also a number of connections between compartments to consider while investigating reservoir connectivity. An obvious connection between compartments is due to the juxtaposition of sand-on-sand at a fault plane. Assuming limited occurrence of shale gouge or cementation, sand-on-sand contacts tend to leak over geologic timeframes (James et al. 2004). Over production timescales, the transmissibility of the fault zone controls the rate and volume of fluid leakage (Lescoffit and Townsend, 2005).

Gas and oil can also leak out of the top of a reservoir through the seal rock, forming another potential connection to an overlying reservoir compartment. The concepts explaining leakage and spill in traps, e.g., as discussed in connection with FIG. 8, can be extended down in scale to the compartment level. The base assumption is that the filling of traps (and thus compartments) depends on the seal capacity relative to closure size. Large traps (and compartments) tend to leak gas and oil until the buoyancy forces and capillary forces are balanced. In this case, there often is more oil than gas in a trap or compartment as a given seal rock has less capacity to trap gas than oil. Traps (and compartments) with less closure size for the same seal rock capacity are prone to leak gas but trap oil. If oil is added to a compartment due to continued migration or leakage from an underlying compartment, the oil spills out of a filled compartment. Smaller closures (or improved seal rock capacity for the same closure) trap oil or gas and spill these out of a compartment if additional oil or gas is added over geologic time. These traps tend to be gas prone, as gas is often generated last during source rock maturation and gas displaces oil.

The RCA technique assume access to adequate hydrocarbon charge and a system in equilibrium (steady-state). Other connections include channel-on-channel contacts where the appropriate sandy lithofacies is present in the two channels. Channel scour is an effective means of connecting two channels and is analogous in many ways to sand-on-sand juxtaposition across faults. For example, muddy drapes at channel-bases are thought to restrict fluid communication in the deepwater channel systems of Gulf of Mexico deepwater fields. See, for example, "Understanding hydrocarbon recovery in deepwater reservoirs; modeling outcrop data in the third dimension," Barton, M. et al., 2004, Anonymous In: AAPG annual meeting. (Abstract) Annual Meeting Expanded Abstracts—American Association of Petroleum Geologists, vol. 13; p. 11. It is analogous to shale gouge in fault zones and fault relays, as both restrict fluid movement (which can be good or bad for well sweep efficiency, depending on the fluid breaking through).

Figure 19:
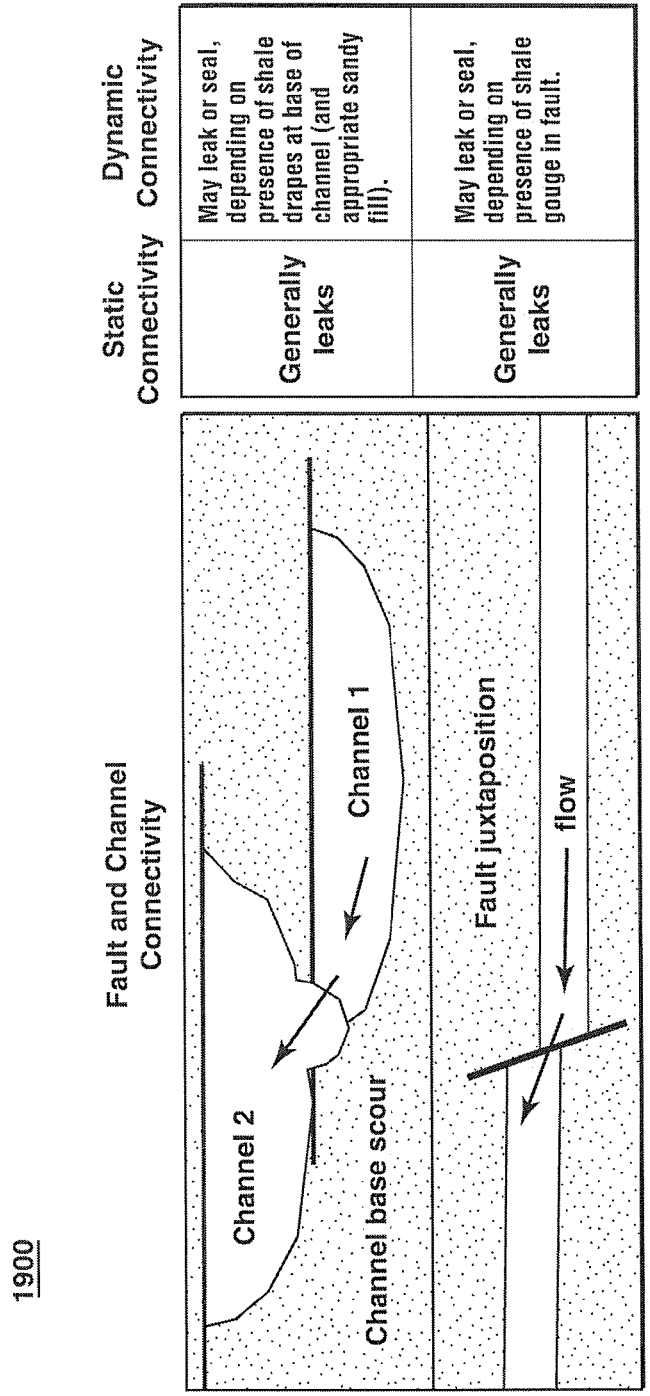
FIG. 19 is a schematic diagram of fault and channel connectivity for a subsurface region.

FIG. 19 is a schematic diagram of fault and channel connectivity 1900 for a subsurface region. Referring to FIG. 19, the present inventors have determined that relatively few sand-on-sand contacts (faults or channels) tend to seal over geologic time scales. However, during production, fluid leakage is more difficult to predict due to complex processes controlling the formation of shale gouge in faults or shale drapes in channels. Accordingly, with fault juxtaposition and channel base scour, both generally leak fluids on geologic timescales (static connectivity), but each can leak, seal, or baffle during production (dynamic connectivity). For example, the channel base scour may leak or seal depending on the presence of shale drapes at base of channel and appropriate sandy fill. The fault juxtaposition may leak or seal depending on the presence of shale gouge in the fault. In general, the fault juxtaposition is analogous to connectivity at the base of erosional channels.

Connectivity in channelized systems has previously been explored through simple experimental or empirical relationships between the number of sand-prone channels and overbank mud (expressed as net-to-gross or NTG). 2D modeling work has established a threshold value of 66% NTG above which communication is expected, while recent 3D models show a lower threshold value of 30% NTG (King et al. 1990; Lame and Hovadik, 2006). See, for example, "Studies in fluviatile sedimentation; an exploratory quantitative model for the architecture of avulsion-controlled alluvial sites;" by Allen, J. R L., 1978, Sedimentary Geology, vol. 21; 2, Pages 129-147; "The connectivity and conductivity of overlapping sand bodies;" by King, P. R., 1990, In, Buller Anthony T. et al., eds, North Sea oil and gas reservoirs; II, Proceedings of the North Sea oil and gas reservoirs conference. [Book, Conference Document] Pages 353-362; and "Connectivity of channelized reservoirs; a modelling approach;" Lame, D. K. and J. Hovadik, 2006, Petroleum Geoscience. 12; 4, Pages 291-308. However, these investigations fail to appreciate the complexity of compartments and connections described above.

The potential compartments and connections are compared to available production fluid data 115, 120. To ensure internal consistency, candidate compartments and connections are checked against available production fluid data. Rather than establishing gas, oil, and water gradients by plotting (and sometimes erroneous) pressure data, available compositional data (from PVT reports, etc.) is used to independently calculate gradients. Petrophysical data is evaluated and compilations of the observed contact information (including GDT's, OUT's, ODT's, WUT's, etc.) are reviewed. Inconsistencies like different fluid types present across an open fault juxtaposition window are rectified (i.e. by adjusting the fault window depths).

The RCA technique can be still carried out in the absence of pre-production pressure data, as is the case for many older fields. In fact, it is quite useful to construct schematic diagrams of pressure versus depth to help construct geologic and connectivity models. For example, observations of different WOC's in a channel crossing an anticline suggest one of two possibilities: 1) hydrodynamic flow causing a tilted WOC; and 2) a breakover point is set up by oil fill down to the top of the baseseal and lateral bounding. Constructing the schematic pressure versus depth plots for the two scenarios reveals two key differences which can be tested. The hydrodynamic case requires both a thicker channel, communication of water pressures across the crest of the structure, and a regional or semi-regional pressure gradient from right to left. The breakover scenario indicates two separate water lines but does not require regional water gradients or variations in sand body thickness. While well-documented cases of hydrodynamically tilted fluid contacts do exist, in many cases the explanation is breakover, e.g., separation of denser fluids across a structure and lateral bounding. Perched water (water trapped in a structural low) is also more common than previously thought and often misinterpretations of field-wide fluid contacts and free water levels can result.

A number of embodiments have been described. Nevertheless, it will be understood that various modifications may be made without departing from the spirit and scope of the invention. For example, referring to FIGS. 16-18, the RCA technique, e.g., process 50, described in connection with FIG. 3 varies from the dynamic connectivity analysis, e.g., process 100, in several ways, e.g., largely based on the use of production data, the testing and refining of multiple scenarios, and the evaluation of weighted uncertainties in the context of various scenarios. For example, modern surveillance tools like 4D seismic data, and downhole monitoring in conjunction with detailed understanding of the geologic framework can be integrated to identify production timescale compartments and to assign appropriate transmissibilities to compartment boundaries. Multiple production scenarios can be evaluated concurrently, e.g., a scenario may become more or less accurate as production continues and more production related data is integrated into the model.

Figure 16:
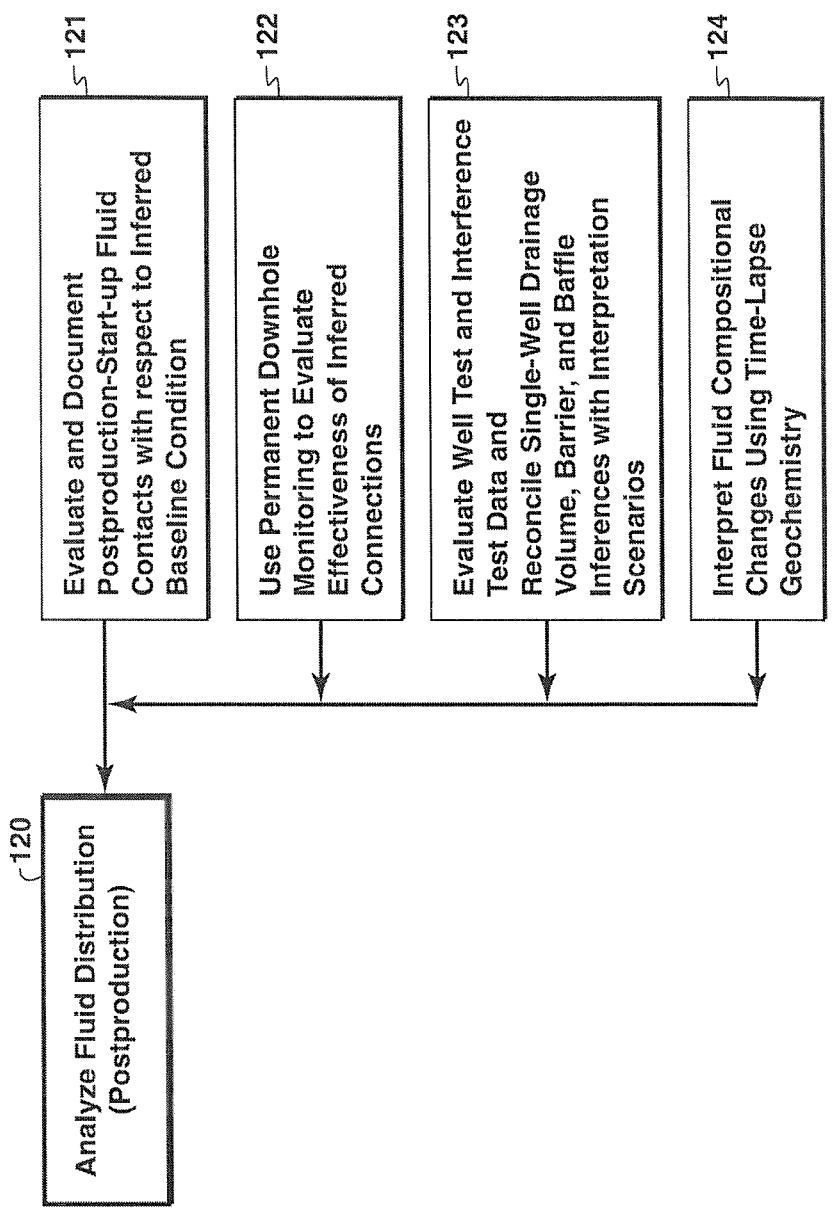
FIG. 16 is a flowchart of exemplary techniques utilized for analyzing fluid distribution.

Referring to FIG. 16, the analysis of fluid distribution (postproduction) 120 may include one or more of the following additional data or process inputs. Specifically, one or more of the following may be performed in any order, at various times during the analysis, and/or repeatedly, such as during an iterative process that involves revisiting models generated in step 130 and/or uncertainties clarified in step 140. For example, production start-up fluid contacts are evaluated and documented with respect to inferred baseline conditions 121, e.g., conditions gleaned from the static connectivity model are treated as baseline conditions initially. In subsequent iterations, e.g., after production has continued in a mature field, the baseline condition may be an earlier combined static and dynamic connectivity model generated by process 100, rather than the model created in step 101 (by process 50). Permanent downhole monitoring is used in one or more wells to evaluate effectiveness of inferred connections 122. Well test and interference test data is evaluated, and single-well drainage volume, barrier, and baffle inferences are reconciled with various interpreted, production scenarios 123. The fluid compositional changes are interpreted using time-lapse geochemistry 124.

Figure 17:
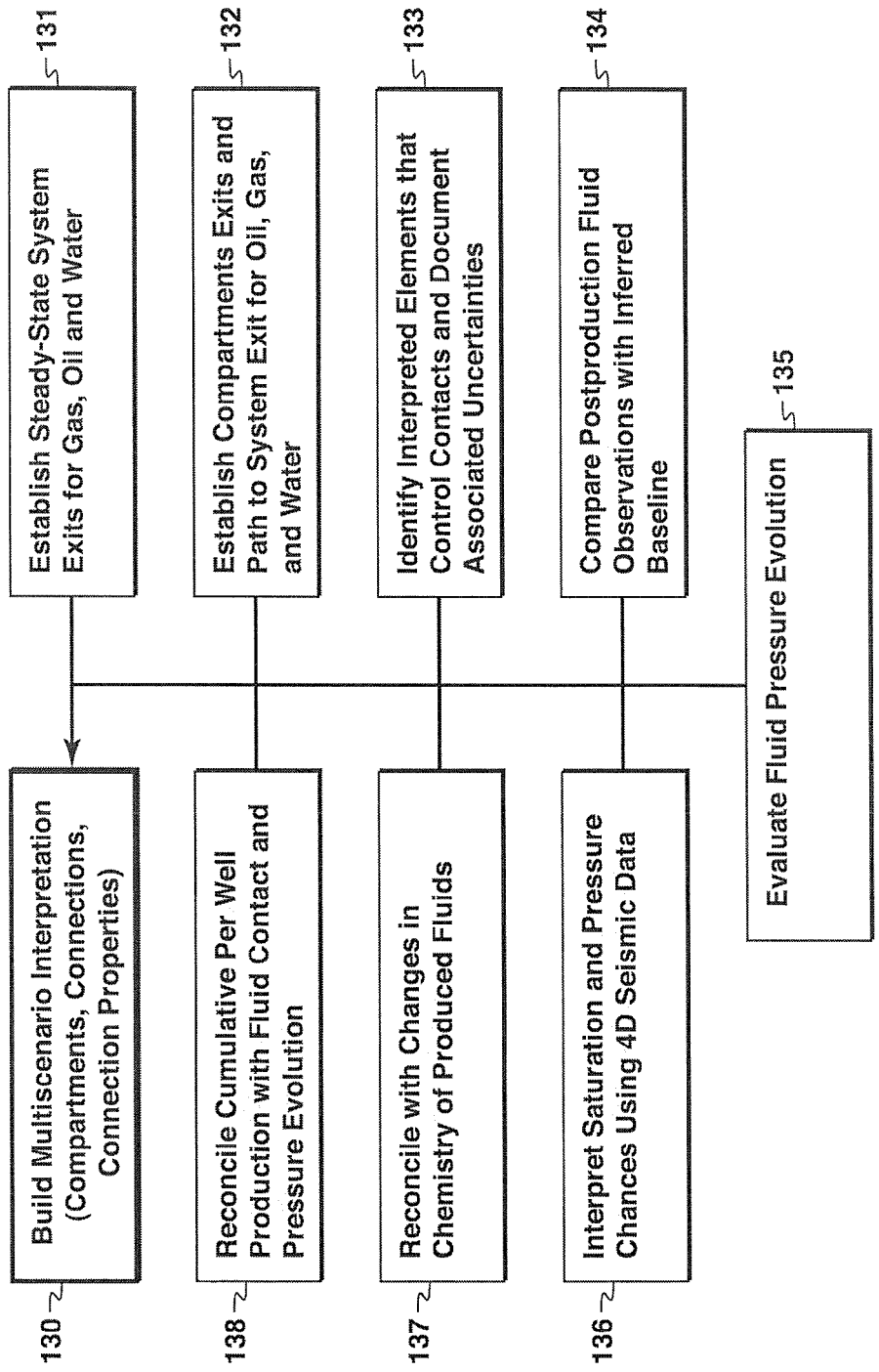
FIG. 17 is a flowchart of exemplary techniques utilized for building one or more multiscenario interpretations of compartments, connections, and connection properties within a subsurface region.

Referring to FIG. 17, building multiscenario interpretations (compartments, connections, and connection properties) may include one or more of the following additional data or process inputs. Specifically, one or more of the following may be performed in any order, at various times during the analysis, using the additional benefit of production data. Steady-state system exits are established for gas, oil, and/or water 131 using production data. Compartment exits and paths to system exits are established for oil, gas, and water 132 using production data. Interpreted elements are identified that control contacts and document associated uncertainties 133. The postproduction fluid observations (dynamic) are compared with an inferred baseline 134. Fluid pressure evolution is evaluated 135, and cumulative per well production is reconciled with fluid contacts and pressure evolution 138. Any changes in chemistry of produced fluids are reconciled with the multiscenario interpretations of compartments, connections, and/or fluid properties 137. Saturation and pressure changes are interpreted using 4D seismic data 136.

Figure 18:
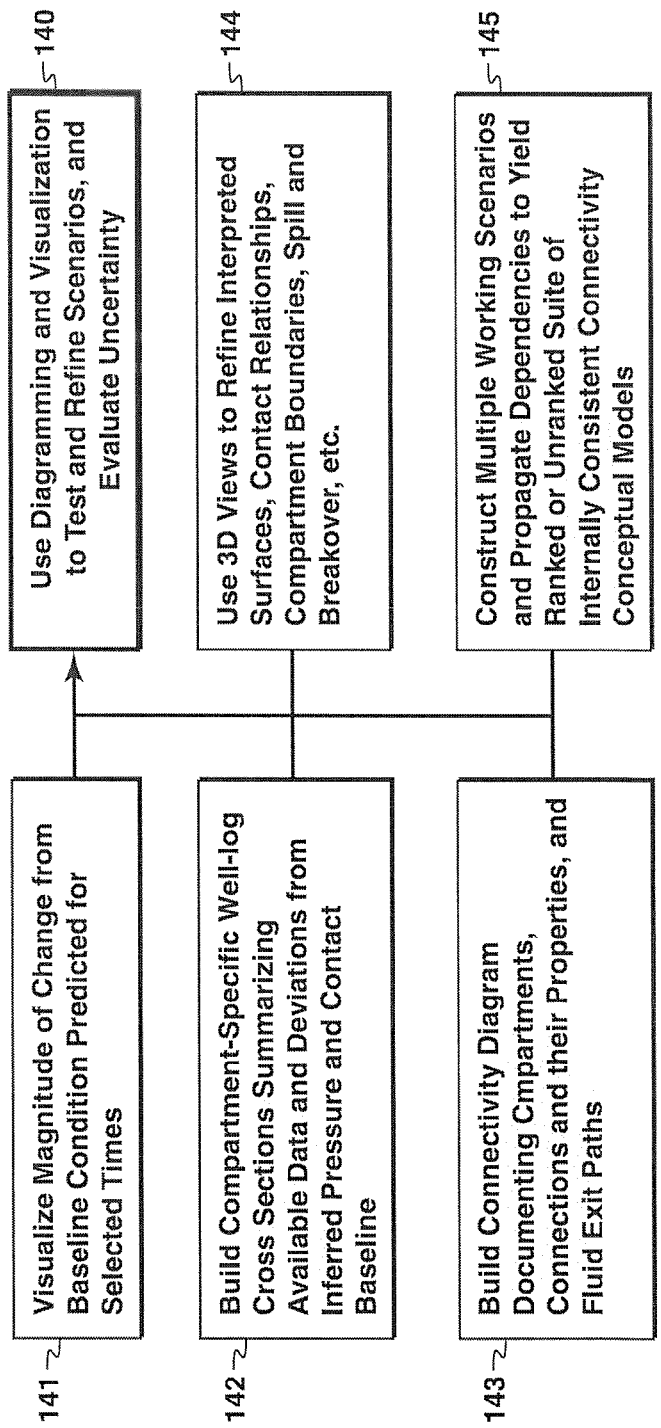
FIG. 18 is a flowchart of exemplary techniques utilized for diagramming and visualization to test and refine scenarios and evaluate uncertainties.

Referring to FIG. 18, the testing and refining of scenarios using diagramming and visualization, and the evaluation of any uncertainties 140, may include one or more of the following additional data or process inputs. Specifically, one or more of the following may be performed in any order, at various times during the analysis, using the benefit of production data. The magnitude of any change from a baseline condition (from step 101 or subsequent dynamic connectivity models) predicted for a selected point in production, e.g., selected time(s), can be displayed and analyzed 141, e.g., for assessing production strategies at various stages. Compartment specific well-log cross sections summarizing available data and deviations from inferred pressure and contact baselines are built 142 to test and refine one or more scenarios. A connectivity diagram, e.g., such as those in FIGS. 8A-8C and FIG. 9, is built that documents compartments, connections and connection properties, and fluid exit paths 143. Three dimensional (3D) views are used to refine interpreted surfaces, contact relationships, compartment boundaries, spill, and/or breakover 144. Multiple working scenarios are constructed and dependencies are propagated 145. Specifically, the multiple working scenarios are developed and analyzed to yield ranked or unranked suites of internally consistent connectivity (dynamic and static) conceptual models 145. A particular advantage of dynamic connectivity analysis is the ability to assess several scenarios over time, e.g., no model or production scenario is assumed to be completely correct or incorrect. Therefore, scenarios, e.g., FIGS. 10-12 in static example, or models, e.g., FIGS. 8A-8C and FIG. 9, having weighted uncertainties of varying degree may become more or less robust over time as production data is integrated into the analysis.

Dynamic connectivity analysis yields a number of benefits, including enabling practitioners to define compartments in hydrocarbon reservoirs, identify connections among compartments, predict their properties with respect to subsurface fluid flow on both geologic and reservoir production time scales, and to predict their impacts on fluid movement under a variety of development and production scenarios. A significant strength of the workflow is its flexibility, allowing it to be tailored to requirements of specific field cases and business problems, using available data of all types, amounts and qualities. Component steps of the workflow are designed to be executed in parallel, yielding an internally consistent set of products that, in aggregate, support a best-possible suite of reservoir development and management decisions. For example, process 100 permits the use of preproduction and production data to determine what constitutes the reservoir, waste rock, and seal for lithologies of interest. In addition, the associated fluids and fluid mobilities are determined.

The identification of compartments and connections may be based on a determination of geometries of top, lateral and base seal surfaces, from offset and juxtaposition of reservoir and associated waste rock lithologies along faults, and from erosional and depositional geometries affecting distribution and effectiveness of intrareservoir seals. The characterization of reservoir fluids may be based on an understanding of observed fluid pressures and predictions of baseline and subsequent fluid types pressures and contacts in unpenetrated compartments. The integration and reconciliation of fluid type, and contact observations and inferences may be based on production data relating to fluid properties, reservoir geometry, production history, well test analysis, and material balance calculations, 4D seismic data, and time-lapse geochemistry. The refinement of multiple working scenarios and for improving comprehension and intuition about connections and ranges of potential impacts on fluid flow can be based on covisualization of a variety of input data and interim interpretive models. The diagramming of reservoir compartments, connections, and fluid movement scenarios, may involve removing extraneous elements of spatial complexity from consideration, to enable rapid effective evaluation of connectivity and associated uncertainties (with dependencies) under any number of development and production scenarios. Referring to FIG. 6, conclusions drawn from component steps are similarly weighted based on data quality and interpreted confidence. Accordingly, redundancies make it possible to apply the dynamic connectivity analysis in many cases where particular data types are absent.

A number of embodiments have been described. Nevertheless, it will be understood that various modifications may be made without departing from the spirit and scope of the invention. For example, although the foregoing implementations have described the RCA analytical approach is also applicable for a wide range of reservoirs, e.g., including clastic (from fluvial to shoreface to deepwater) and carbonate reservoirs. RCA models are used to predict fluid contacts in faulted reservoirs where other approaches have failed, to locate by-passed pay opportunities for infill drilling in mature fields, and to condition connections in reservoir simulation models. Specifically, RCA is an integrated technology that challenges the interpreter to evaluate and incorporate fluid property, composition, and pressure data with stratigraphic and structural interpretations of a reservoir to achieve a deeper, more comprehensive understanding of reservoir compartments and the connections between the compartments, e.g. both preproduction and after production has started.

The RCA input to the aforementioned techniques can include various seismic models, geologic models or simulation models which contain a description of the subsurface geology. These models incorporate one or more connectivity analysis techniques, e.g., a model can be subdivided into small divisions which are referred to as cells. These cells may be small cubes or some other geometric shape that represent small portions of the reservoir and contain information on the portion's physical or chemical properties, such as density, porosity, lithologic facies, etc.

One or more of the aforementioned processes and/or techniques, e.g., such as the integration of potential compartments and connections into a model, can be implemented in digital electronic circuitry, or in computer hardware, firmware, software, or in any combination thereof. Any of the aforementioned functionality may be implemented as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

One or more process steps of the invention can be performed by one or more programmable processors executing a computer program to perform functions of the invention by operating on input data and generating output. One or more steps can also be performed by, and an apparatus or system can be implemented as, special purpose logic circuitry, e.g., an FPGA (field programmable gate array) or an ASIC (application-specific integrated circuit). In addition, data acquisition and display may be implemented through a dedicated data collection and/or processing system, e.g., containing data acquisition hardware, such as hydrophones and/or geophones, a processor(s), and various user and data input and output interfaces, such as a display component for graphically displaying one or more of the generated connectivity models obtained through any of the aforementioned process steps or processes.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include forms of non-volatile memory, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM (compact disk read-only memory) and DVD-ROM (digital versatile disk read-only memory) disks. The processor and the memory can be supplemented by, or incorporated in special purpose logic circuitry.

All such modifications and variations are intended to be within the scope of the present invention, as defined in the appended claims. Persons skilled in the art will also readily recognize that in preferred embodiments, at least some of the method steps method are performed on a computer, e.g., the method may be computer implemented. In such cases, the resulting model parameters may either be downloaded or saved to computer memory.

What is claimed is:

1. A computer implemented method for analyzing connected quality of a subsurface region, said method comprising:
    analyzing geologic time scale reservoir connectivity for the subsurface region;
    developing a baseline reservoir connectivity model based on the geologic time scale reservoir connectivity for the subsurface region, wherein the baseline reservoir connectivity model includes determining compartments, at least one connection between compartments, and connection properties;
    interpreting the compartments within the subsurface region based on production data;
    analyzing fluid properties within the subsurface region based on production data;
    analyzing fluid distribution within the subsurface region based on production data; and
    using a computer to build a production time scale fluid connectivity model having compartments, at least one connection, and connection properties based on production data and a reconciliation of the baseline reservoir connectivity model with the production data.

2. The method of claim 1, further comprising acquiring production data from at least one well within the subsurface region.

3. The method of claim 2, further comprising estimating recoverable hydrocarbons based on the production time scale reservoir connectivity.

4. The method of claim 1, further comprising evaluating uncertainties within the connectivity models based on pre-production and production data.

5. The method of claim 4, further comprising building a multiscenario interpretation of at least one of a compartment, connection, and connection property based on evaluating uncertainties within the connectivity models.

6. The method of claim 5, wherein analyzing geologic time scale reservoir connectivity for the subsurface region and developing a baseline reservoir connectivity model based on the geologic time scale reservoir connectivity for the subsurface region, are each based on preproduction data.

7. The method of claim 6, wherein the multiscenario interpretation is based on preproduction and production data.

8. The method of claim 5, wherein analyzing fluid distribution comprises:
    evaluating production start-up fluid contacts; and
    documenting fluid contacts with respect to any inferred baseline conditions.

9. The method of claim 5, wherein analyzing fluid distribution comprises evaluating effectiveness of inferred connections based on downhole monitoring data.

10. The method of claim 5, wherein analyzing fluid distribution comprises:
    evaluating well test and interference test data; and
    reconciling single-well drainage volume, barrier, and baffle inferences with various interpreted, production scenarios.

11. The method of claim 5, wherein analyzing fluid distribution comprises interpreting fluid compositional changes based on time-lapse geochemistry.

12. The method of claim 5, wherein building multiscenario interpretations comprises establishing steady-state system fluid exits using production data.

13. The method of claim 5, wherein building multiscenario interpretations comprises establishing compartment exits and paths to system fluid exits using production data.

14. The method of claim 5, wherein building multiscenario interpretations comprises:
    identifying interpreted elements that control fluid contacts; and
    documenting associated uncertainties with interpreted elements.

15. The method of claim 5, wherein building multiscenario interpretations comprises:
    evaluating fluid pressure evolution; and
    reconciling cumulative prewell production data with fluid contacts and pressure evolution.

16. The method of claim 5, wherein building multiscenario interpretations comprises reconciling any changes in chemistry of produced fluids with the multiscenario interpretations of compartments, connections, and/or fluid properties.

17. The method of claim 5, wherein building multiscenario interpretations comprises interpreting saturation and pressure changes based on 4D seismic data.

18. The method of claim 5, wherein testing and refining of scenarios comprises:
    predicting a magnitude of any change in a multiscenario interpretation for a selected point in production and with respect to a baseline condition; and
    displaying the magnitude of the change.

19. The method of claim 5, wherein testing and refining of scenarios comprises building compartment specific well-log cross sections summarizing available data and deviations from inferred pressure and contact baselines.

20. The method of claim 19, wherein testing and refining of scenarios comprises building a connectivity diagram that documents compartments, connections and connection properties, and fluid exit paths for the subsurface region.

21. The method of claim 20, further comprising refining, based on three dimensional (3D) views of the subsurface region, at least one of interpreted surfaces, contact relationships, compartment boundaries, spill and breakover.

22. The method of claim 5, wherein testing and refining of scenarios comprises building a connectivity diagram that documents compartments, connections and connection properties, and fluid exit paths for the subsurface region.

23. The method of claim 22, further comprising developing and analyzing the multiple working scenarios to yield ranked and unranked suites of internally consistent connectivity conceptual models.

24. The method of claim 5, further comprising refining, based on three dimensional (3D) views of the subsurface region, at least one of interpreted surfaces, contact relationships, compartment boundaries, spill and breakover.

25. The method of claim 5, wherein testing and refining of scenarios comprises constructing multiple working scenarios and propagating dependencies for the scenarios.

26. The method of claim 5, further comprising acquiring production data for a well within the subsurface region.

27. A computer implemented method for analyzing hydrocarbon production data from a subsurface region, comprising:
- analyzing geologic time scale reservoir connectivity and production time scale reservoir connectivity for the subsurface region, wherein analyzing geologic time scale and production time scale reservoir connectivity includes interpreting compartments, interpreting at least one connection, analyzing fluid properties, and analyzing fluid distribution;
- using a computer to build a reservoir connectivity model based on the geologic time scale and production time scale reservoir connectivity for the subsurface region, wherein the reservoir connectivity model includes a plurality of production scenarios each including reservoir compartments, at least one connection, and connection properties, and
- testing and refining each of the production scenarios based on production data for the subsurface region.

28. A computer implemented method for producing hydrocarbons from a subsurface region, comprising:
- analyzing geologic time scale reservoir connectivity and production time scale reservoir connectivity for the subsurface region, wherein analyzing geologic time scale and production time scale reservoir connectivity includes interpreting compartments, analyzing fluid properties, and analyzing fluid distribution;
- using a computer to build a reservoir connectivity model based on the geologic time scale and production time scale reservoir connectivity for the subsurface region, wherein the reservoir connectivity model includes a plurality of production scenarios each including reservoir compartments, at least one connection, and connection properties, and
- testing and refining each of the production scenarios based on production data for the subsurface region; and
- estimating an ultimate recovery amount of hydrocarbons from the subsurface region based on the production time scale reservoir connectivity.

29. The method of claim 28, further comprising:
- interpreting the connectivity model to determine a formation as potentially hydrocarbon bearing; and
- drilling a well to the formation interpreted in the connectivity model as potentially hydrocarbon bearing.

30. The method of claim 29, further comprising producing hydrocarbons from the well and obtaining production data from the well.

31. The method according to claim 30, further comprising estimating in-place hydrocarbons based on the geologic time scale reservoir connectivity.

32. The method according to claim 28, further comprising estimating in-place hydrocarbons based on the geologic time scale reservoir connectivity.

* * * * *